US012134975B2

(12) United States Patent
Kobayashi et al.

(10) Patent No.: US 12,134,975 B2
(45) Date of Patent: Nov. 5, 2024

(54) BLADE RING ASSEMBLY, GAS TURBINE, AND METHOD FOR REFURBISHING GAS TURBINE

(71) Applicant: MITSUBISHI HEAVY INDUSTRIES, LTD., Tokyo (JP)

(72) Inventors: Hiroaki Kobayashi, Tokyo (JP); Norihiko Nagai, Tokyo (JP); Kazuharu Hirokawa, Tokyo (JP); Shinya Hashimoto, Tokyo (JP); Naoki Taketa, Tokyo (JP); Takeshi Umehara, Tokyo (JP); Koji Watanabe, Tokyo (JP); Yoshio Fukui, Tokyo (JP); Kenta Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/284,969

(22) PCT Filed: Apr. 12, 2022

(86) PCT No.: PCT/JP2022/017571
§ 371 (c)(1),
(2) Date: Sep. 29, 2023

(87) PCT Pub. No.: WO2022/224871
PCT Pub. Date: Oct. 27, 2022

(65) Prior Publication Data
US 2024/0183277 A1    Jun. 6, 2024

(30) Foreign Application Priority Data

Apr. 19, 2021 (JP) .................................. 2021-070571

(51) Int. Cl.
*F01D 9/04* (2006.01)
*F02C 7/16* (2006.01)

(52) U.S. Cl.
CPC ............. *F01D 9/041* (2013.01); *F01D 9/042* (2013.01); *F02C 7/16* (2013.01); *F05D 2240/35* (2013.01)

(58) Field of Classification Search
CPC . F01D 9/041; F01D 9/042; F02C 7/16; F05D 2240/35
See application file for complete search history.

(56) References Cited

U.S. PATENT DOCUMENTS 2,625,367 A    1/1953    Rainbow et al.
5,394,687 A    3/1995    Chen et al.
(Continued)

FOREIGN PATENT DOCUMENTS

JP    7-189738    7/1995
JP    2008-240712    10/2008
(Continued)

OTHER PUBLICATIONS

International Search Report issued Jun. 28, 2022 in International (PCT) Application No. PCT/JP2022/017571, with English-language translation.
(Continued)

*Primary Examiner* — Jesse S Bogue
(74) *Attorney, Agent, or Firm* — Wenderoth, Lind & Ponack, L.L.P.

(57) ABSTRACT

A blade ring assembly including: a turbine blade ring extending in a circumferential direction about an axis; a component to be cooled, disposed on an inner circumferential side of the turbine blade ring; and an outer circumferential side component disposed on an outer circumferential side of the turbine blade ring. The turbine blade ring has a cooling medium intake port leading from an outer circumferential surface to an inner circumferential surface of the turbine blade ring. The outer circumferential side compo-
(Continued)

nent includes: a first wall portion which covers at least a portion of the cooling medium intake port from the outer circumferential side of the turbine blade ring; and a second wall portion which extends from an end portion of the first wall portion on the axially downstream thereof toward the outer circumferential side of the turbine blade ring.

12 Claims, 13 Drawing Sheets

(56) References Cited

U.S. PATENT DOCUMENTS

| | | | | |
|---|---|---|---|---|
| 7,137,777 B2* | 11/2006 | Fried | ............ | F01D 5/082 |
| | | | | 415/121.2 |
| 7,770,375 B2* | 8/2010 | Alvanos | ............ | F02C 7/05 |
| | | | | 55/306 |
| 8,943,791 B2* | 2/2015 | Tibbott | ............ | F01D 9/065 |
| | | | | 60/39.092 |
| 9,988,936 B2* | 6/2018 | Nasr | ............ | F01D 25/12 |
| 10,280,785 B2* | 5/2019 | Briggs | ............ | F01D 11/24 |
| 10,323,573 B2* | 6/2019 | Lutjen | ............ | F01D 11/12 |
| 10,533,496 B2* | 1/2020 | Laing | ............ | F02C 7/04 |
| 11,326,516 B2* | 5/2022 | Barberger | ............ | F01D 5/082 |
| 11,511,222 B2* | 11/2022 | Gover | ............ | B01D 46/0045 |
| 11,918,943 B2* | 3/2024 | Stone | ............ | F01D 9/065 |
| 2004/0221720 A1* | 11/2004 | Anderson | ............ | B01D 45/02 |
| | | | | 55/394 |
| 2007/0231123 A1* | 10/2007 | Dervaux | ............ | F01D 9/06 |
| | | | | 415/115 |
| 2009/0126337 A1 | 5/2009 | Hazzard et al. | | |
| 2009/0202337 A1* | 8/2009 | Bosley | ............ | F01D 25/24 |
| | | | | 415/115 |
| 2009/0255230 A1 | 10/2009 | Mildner | | |
| 2011/0067378 A1 | 3/2011 | Tibbott et al. | | |

FOREIGN PATENT DOCUMENTS

| | | |
|---|---|---|
| JP | 2010-501764 | 1/2010 |
| TW | 144345 | 10/1990 |
| TW | 284827 | 9/1996 |

OTHER PUBLICATIONS

Written Opinion of the International Searching Authority issued Jun. 28, 2022 in International (PCT) Application No. PCT/JP2022/017571, with English-language translation.

Office Action issued Jul. 5, 2023 in corresponding Taiwanese Patent Application No. 111114230, with English-language translation.

* cited by examiner

BLADE RING ASSEMBLY, GAS TURBINE, AND METHOD FOR REFURBISHING GAS TURBINE

TECHNICAL FIELD

The present disclosure relates to a blade ring assembly, a gas turbine, and a method for refurbishing a gas turbine.

Priority is claimed on Japanese Patent Application No. 2021-070571 filed on Apr. 19, 2021, the content of which is incorporated herein by reference.

BACKGROUND ART

PTL 1 discloses a gas turbine that includes a mechanism for separation of particles included in cooling air. The gas turbine includes a protective element for particle separation that is disposed closer to an inner peripheral side (a rotor side) than a stator vane is, and the protective element for particle separation makes it difficult for suspended particles to flow into an intake opening.

CITATION LIST

Patent Literature

[PTL 1] PCT Japanese Translation Patent Publication No. 2010-501764

SUMMARY OF INVENTION

Technical Problem

However, the protective element for particle separation described in PTL 1 does not restrain cooling air, which is supplied into a casing from a compressor, from flowing directly into an air path communicating with the inside of the stator vane. For this reason, cooling air containing a foreign substance may flow into the stator vane, and thus, a cooling path in the stator vane may be clogged.

The present disclosure has been made to solve the above-described problem, and an object of the present disclosure is to provide a blade ring assembly, a gas turbine, and a method for refurbishing a gas turbine with which it is possible to restrain a foreign substance from flowing into a cooling target component such as a stator vane, for example.

Solution to Problem

In order to solve the above-described problem, an aspect of the present disclosure provides a blade ring assembly including a turbine blade ring that extends in a circumferential direction around an axis, a cooling target component that is disposed on an inner peripheral side of the turbine blade ring, and an outer peripheral side component that is disposed on an outer peripheral side of the turbine blade ring. The turbine blade ring includes a cooling medium intake port leading to an inner peripheral surface of the turbine blade ring from an outer peripheral surface of the turbine blade ring. The outer peripheral side component includes a first wall portion that covers at least a portion of the cooling medium intake port from the outer peripheral side of the turbine blade ring and that extends to be closer to an axial downstream side, which is one of both sides in an axial direction in which the axis extends, than the cooling medium intake port is, and a second wall portion that extends toward the outer peripheral surface of the turbine blade ring from an end portion of the first wall portion on the axial downstream side and that covers at least a portion of a space between the first wall portion and the cooling medium intake port from the axial downstream side.

In order to solve the above-described problem, an aspect of the present disclosure provides a gas turbine including a blade ring assembly, a rotor that is rotatable around the axis, a casing that covers an outer peripheral side of the rotor, and a can-type combustor that generates a combustion gas through combustion of fuel and that sends the combustion gas into the casing. The blade ring assembly includes a turbine blade ring that extends in a circumferential direction around the axis, a cooling target component that is disposed on an inner peripheral side of the turbine blade ring, and an outer peripheral side component that is disposed on an outer peripheral side of the turbine blade ring. The turbine blade ring includes a cooling medium intake port leading to an inner peripheral surface of the turbine blade ring from an outer peripheral surface of the turbine blade ring. The outer peripheral side component includes a first wall portion that covers at least a portion of the cooling medium intake port from the outer peripheral side of the turbine blade ring and that extends to be closer to an axial downstream side, which is one of both sides in an axial direction in which the axis extends, than the cooling medium intake port is, and a second wall portion that extends toward the outer peripheral surface of the turbine blade ring from an end portion of the first wall portion on the axial downstream side and that covers at least a portion of a space between the first wall portion and the cooling medium intake port from the axial downstream side. The blade ring assembly is disposed on an inner peripheral side of the casing. The casing includes, as a portion of a wall portion that defines an accommodation chamber in which the blade ring assembly is exposed and a cooling medium flows, a partition wall that is provided closer to the axial downstream side than the cooling medium intake port is and that extends in a radial direction of the turbine blade ring.

In order to solve the above-described problem, an aspect of the present disclosure provides a method for refurbishing a gas turbine including a turbine blade ring that extends in a circumferential direction around an axis and a stator vane disposed on an inner peripheral side of the turbine blade ring, the method including: a step of removing the stator vane from the turbine blade ring; a step of attaching a shielding cover to the stator vane in which the shielding cover is attached to an inner shroud so that the shielding cover covers at least a portion of a space of the inner shroud from the inner peripheral side, the stator vane including a vane body that is disposed in a combustion gas flow path and that has a vane-like shape and the inner shroud that is provided at an inner peripheral end of the vane body and that includes the space; and a step of attaching the stator vane with the shielding cover attached thereto to the turbine blade ring with a foreign substance separation cover attached thereto, the turbine blade ring including a cooling medium intake port that leads to an inner peripheral surface of the turbine blade ring from an outer peripheral surface of the turbine blade ring, and the foreign substance separation cover being disposed on an outer peripheral side of the turbine blade ring and covering at least a portion of the cooling medium intake port.

Advantageous Effects of Invention

With a blade ring assembly, a gas turbine, and a method for refurbishing a gas turbine of the present disclosure, it is possible to restrain a foreign substance from flowing into a cooling target component such as a stator vane, for example.

DESCRIPTION OF EMBODIMENTS

Figure 1:
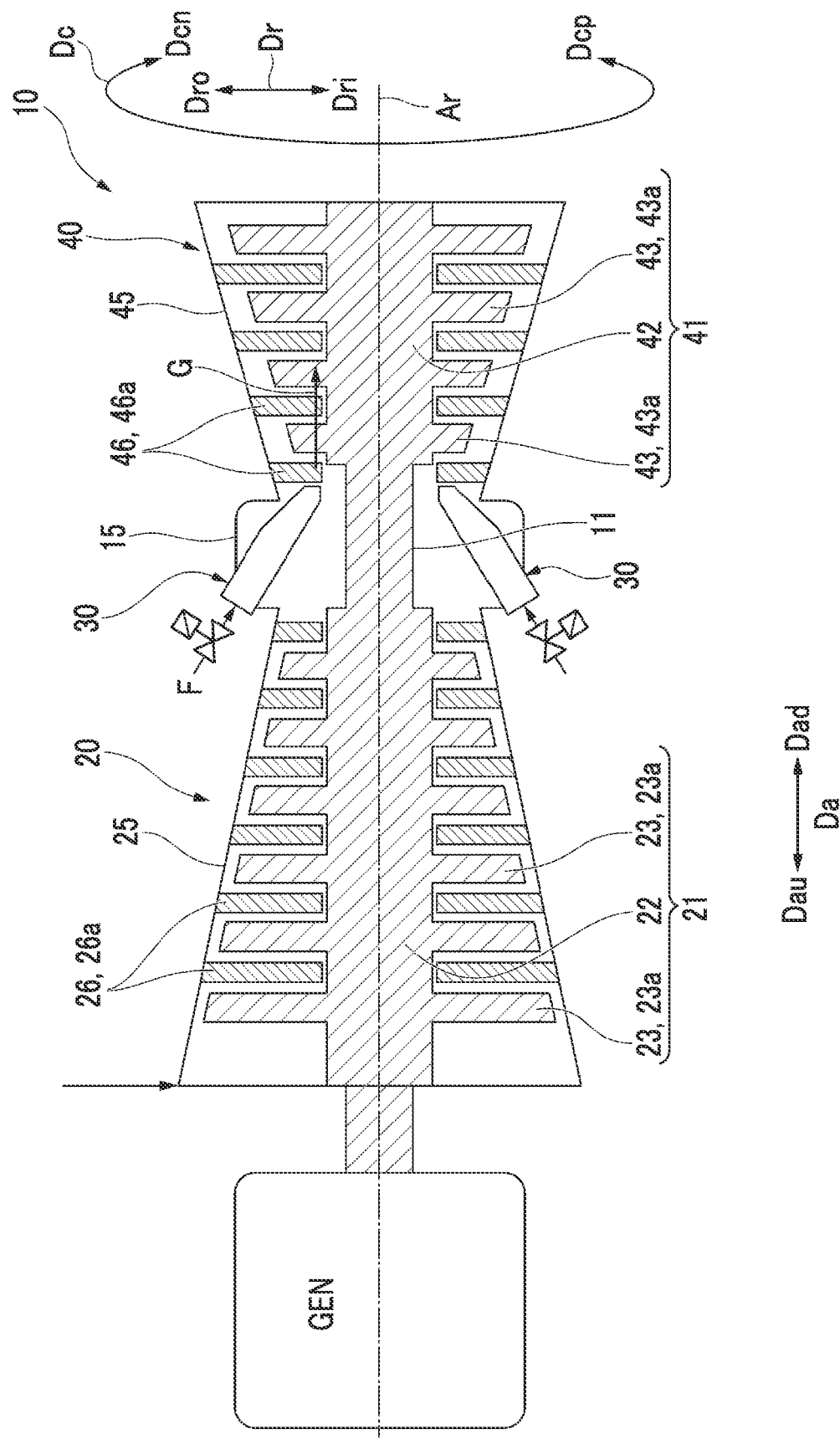
FIG. 1 is a cross-sectional view schematically showing the entire body of a gas turbine according to a first embodiment of the present disclosure.

Hereinafter, a blade ring assembly, a gas turbine, and a method for refurbishing a gas turbine according to a first embodiment of the present disclosure will be described with reference to the drawings. In the following description, configurations having the same or similar functions are given the same reference numerals. In addition, repetitive descriptions of such configurations may be omitted.

First Embodiment

Configuration of Gas Turbine

FIG. 1 is a cross-sectional view schematically showing the entire body of a gas turbine 10 according to the first embodiment. The gas turbine 10 includes a compressor 20 that compresses air A, a combustor 30 that combusts fuel F in the air A, which has been compressed by the compressor 20, to generate combustion gas G, and a turbine 40 that is driven by the combustion gas G.

The compressor 20 includes a compressor rotor 21 that rotates around an axis Ar, a compressor casing 25 that covers an outer peripheral side of the compressor rotor 21, and a plurality of stator vane stages 26. The turbine 40 includes a turbine rotor 41 that rotates around the axis Ar, a turbine casing 45 that covers an outer peripheral side of the turbine rotor 41, and a plurality of stator vane stages 46.

The compressor rotor 21 and the turbine rotor 41 are positioned on the same axis Ar and are connected to each other to form a gas turbine rotor 11. For example, a rotor of a generator GEN is connected to the gas turbine rotor 11. The compressor casing 25 and the turbine casing 45 are connected to each other to form a gas turbine casing 15. The gas turbine casing 15 is an example of a "casing". The combustor 30 is, for example, a can-type combustor.

In the following description, a direction in which the axis Ar extends will be referred to as an axial direction Da, a circumferential direction around the axis Ar will be referred to as a circumferential direction Dc, and a direction perpendicular to the axis Ar will be referred to as a radial direction Dr. One of both sides in the axial direction Da that is close to the compressor 20 with respect to the turbine 40 will be referred to as an axial upstream side Dau, and a side opposite thereto will be referred to as an axial downstream side Dad. In addition, one of both sides in the radial direction Dr that is close to the axis Ar will be referred to as a radial inner side Dri, and a side opposite thereto will be referred to as a radial outer aide Dro. Additionally, one of both directions along the circumferential direction Dc that is a direction from a pressure surface to a suction surface of a vane body 110 of a stator vane 46a will be referred to as a circumferential direction Dcn, and a direction from the suction surface to the pressure surface of the vane body 110 will be referred to as a circumferential direction Dcp. Hereinafter, the axial upstream side Dau in the axial direction Da may be referred to as a front side, and the axial downstream side Dad in the axial direction Da may be referred to as a rear side. The axial direction Da is a direction in which the combustion gas G flows.

The compressor rotor 21 includes a rotor shaft 22 that is centered on the axis Ar and that extends in the axial direction Da and a plurality of rotor blade stages 23 attached to the rotor shaft 22. The plurality of rotor blade stages 23 are arranged in the axial direction Da. Each of the rotor blade stages 23 is composed of a plurality of rotor blades 23a arranged in the circumferential direction Dc. For each of the plurality of rotor blade stages 23, the stator vane stage 26 is disposed on the axial downstream side Dad. Each stator vane stage 26 is provided inside the compressor casing 25. Each of the stator vane stages 26 is composed of a plurality of stator vanes 26a arranged in the circumferential direction Dc.

The turbine rotor 41 includes a rotor shaft 42 that is centered on the axis Ar and that extends in the axial direction Da and a plurality of rotor blade stages 43 attached to the rotor shaft 42. The plurality of rotor blade stages 43 are arranged in the axial direction Da. Each of the rotor blade stages 43 is composed of a plurality of rotor blades 43a arranged in the circumferential direction Dc. For each of the plurality of rotor blade stages 43, the stator vane stage 46 is disposed on the axial upstream side Dau. Each stator vane stage 46 is provided inside the turbine casing 45. Each of the stator vane stages 46 is composed of a plurality of gas turbine stator vanes 46a arranged in the circumferential direction Dc. In the following description, the gas turbine stator vanes will be simply referred to as stator vanes. The gas turbine stator vanes (stator vanes) 46a are examples of "cooling target components".

Figure 2:
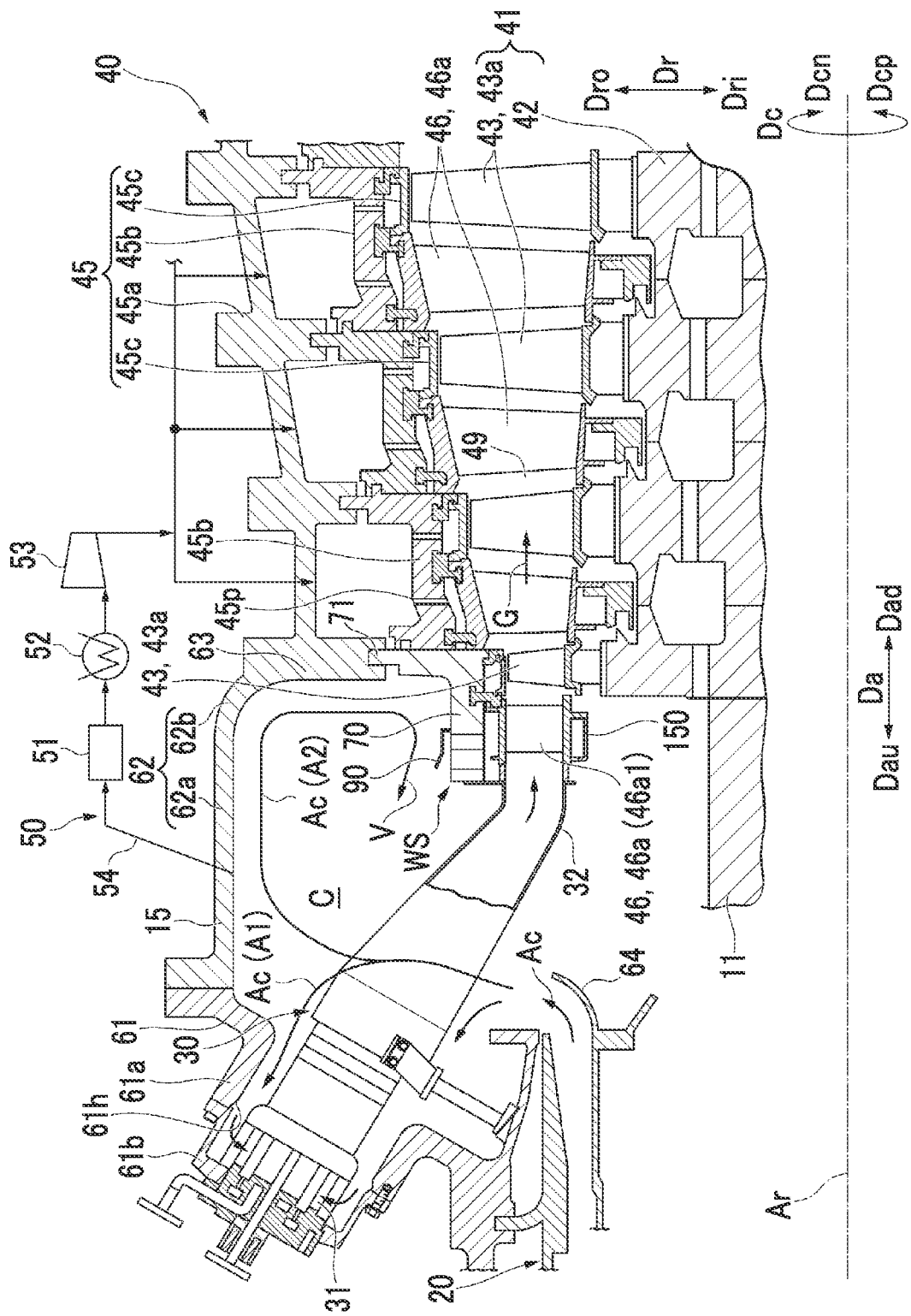
FIG. 2 is an enlarged cross-sectional view showing a portion of the gas turbine according to the first embodiment of the present disclosure.

FIG. 2 is an enlarged cross-sectional view showing a portion of the gas turbine 10 according to the first embodiment. Note that, for the sake of convenience of description, FIG. 2 schematically shows a cross section of a blade ring assembly WS shown in FIG. 3, which is taken along line F2-F2. The turbine casing 45 includes a tubular outer casing 45a constituting an outer shell of the turbine casing 45, an inner casing 45b fixed to an inner side of the outer casing 45a, and a plurality of ring segments 45c fixed to an inner side of the inner casing 45b. Each of the plurality of ring segments 45c is provided at a position between two of the plurality of stator vane stages 46 that are adjacent to each other. Therefore, for each of the ring segments 45c, the rotor blade stage 43 is disposed on the radial inner side Dri.

A space between the rotor shaft 42 and the turbine casing 45 in the radial direction Dr where the stator vanes 46a and the rotor blades 43a are disposed constitutes a combustion gas flow path 49 through which the combustion gas G from the combustor 30 flows. The combustion gas flow path 49 has an annular shape centered on the axis Ar and is long in the axial direction Da.

The gas turbine 10 of the present embodiment includes a cooling device 50 that supplies cooling air to the stator vanes 46a and to the ring segments 45c of the second and subsequent stages in the axial direction Da. The cooling device 50 includes a foreign substance collector 51, a cooler 52, a boost compressor 53, and a cooling air line 54. The foreign substance collector 51 is, for example, a strainer including a plurality of pores and separates a foreign substance contained in cooling air flowing through the cooling air line 54. The cooler 52 cools the cooling air flowing through the cooling air line 54. The boost compressor 53 increases the pressure of the cooling air flowing through the cooling air line 54. Through the cooling air line 54, compressed air Ac in the gas turbine casing 15 is extracted as cooling air, and the extracted cooling air is supplied to the inside of the outer casing 45a via the foreign substance collector 51, the cooler 52, and the boost compressor 53.

Cooling air paths 45p that penetrate the inner casing 45b in a direction from the radial outer side Dro to the radial inner side Dri are formed in the inner casing 45b of the turbine casing 45. The cooling air supplied from the cooling air line 54 to the inside of the outer casing 45a is introduced into the stator vanes 46a and the ring segments 45c of the second and subsequent stages via the cooling air paths 45p of the inner casing 45b so that the cooling air is used for the cooling of the stator vanes 46a and the ring segments 45c. Here, since the cooling air line 54 is provided with the foreign substance collector 51, a foreign substance is less likely to reach the stator vanes 46a and the ring segments 45c of the second and subsequent stages. Note that a path for supply of cooling air to the stator vanes 46a is not limited to a path as described above.

Operation of Gas Turbine

Referring to FIG. 1 again, the operation of the gas turbine 10 will be described. The compressor 20 compresses the air A to generate the compressed air Ac. The compressed air Ac generated by the compressor 20 flows into the combustor 30. The fuel F is supplied to the combustor 30. In the combustor 30, the fuel F is combusted in the compressed air so that the combustion gas G of which the temperature and the pressure are high is generated. The combustion gas G generated by the combustor 30 is sent from the combustor 30 to the combustion gas flow path 49 inside the turbine 40. The combustion gas G rotates the turbine rotor 41 while flowing through the combustion gas flow path 49 toward the axial downstream side Dad. The rotor of the generator GUI connected to the gas turbine rotor 11 is rotated as the turbine rotor 41 rotates. As a result, the generator GEN generates electricity.

Blade Ring Assembly

As shown in FIG. 2, the gas turbine 10 includes the blade ring assembly WS. The blade ring assembly WS is disposed on an inner peripheral side of the gas turbine casing 15. In the present embodiment, the blade ring assembly WS is disposed at an upstream end of the turbine 40 in the axial direction Da and includes a turbine blade ring 70 and a plurality of stator vanes 46a1 each constituting the stator vane 46a of the first stage in the axial direction Da. In the present embodiment, the compressed air Ac supplied from the compressor 20 to the inside of the gas turbine casing 15 is directly supplied, as cooling air, to the first-stage stator vanes 46a1 without passing through a foreign substance collector. Therefore, in the present embodiment, the turbine blade ring 70 is provided with dust separators 90 that restrain a foreign substance contained in the compressed air Ac from reaching the stator vanes 46a1. Hereinafter, this will be described in detail. Hereinafter, for the sake of convenience of description, the compressed air Ac may be referred to as cooling air Ac.

Configuration in Vicinity of Blade Ping Assembly

The gas turbine casing 15 includes, as wall portions that define an accommodation chamber C that accommodates the combustor 30, a front wall 61, a peripheral wall 62, and a rear wall 63. The accommodation chamber C is a space inside the gas turbine casing 15 in which the blade ring assembly WS is exposed and the compressed air Ac flows.

The front wall 61 is positioned on the axial upstream side Dau with respect to the accommodation chamber C. The front wall 61 includes a tubular portion 61a provided with an opening 61h and a tubular lid portion 61b that is attached to the tubular portion 61a and that covers the opening 61h. A portion of the combustor 30 is disposed inside the tubular portion 61a and the tubular lid portion 61b. For example, an intake portion 31 of the combustor 30 is disposed inside the tubular lid portion 61b.

The peripheral wall 62 is positioned on the radial outer side bro with respect to the accommodation chamber C. The peripheral wall 62 extends between the front wall 61 and the rear wall 63, and connects the front wall 61 and the rear wall 63 to each other. The peripheral wall 62 includes a first portion 62a and a second portion 62b. The first portion 62a is a portion connected to the front wall 61. The first portion 62a extends in the axial direction Da. The second portion 62b is a portion that is positioned closer to the axial downstream side Dad than the first portion 62a is and that is connected to the rear wall 63. The second portion 62b is, for example, an inclined portion (a reduced diameter portion) that is inclined to become closer to the radial inner side Dai toward the axial downstream side Dad. The second portion 62b includes, for example, an arc-shaped portion at which the degree of inclination with respect to the axial direction Da rapidly increases toward the axial downstream side Dad.

The rear wall 63 is positioned on the axial downstream side Dad with respect to the accommodation chamber C. The rear wall 63 extends along the radial direction Dr. The rear wall 63 is a partition wall that closes a portion of the accommodation chamber C that is on the axial downstream side Dad. A blade ring fixation portion 71 of the turbine blade ring 70, which will be described later, is fixed to the rear wall 63. The rear wall 63 is positioned closer to the axial downstream side Dad than air intake ports 72 (which will be described later) of the turbine blade ring 70 are.

As shown in FIG. 2, a guide portion 64 for the compressed air Ac is provided at an inlet of the accommodation chamber C as seen from the compressor 20. The guide portion 64 is, for example, a turning vane that is provided to be inclined with respect to the axial direction Da, and changes a direction in which the compressed air Ac flowing from the compressor 20 flows to a direction toward the peripheral wall 62 of the gas turbine casing 15. However, the guide portion 64 may be omitted as long as a portion of the compressed air Ac flowing from the compressor 20 proceeds to the peripheral wall. 62 or the rear wall 63.

Configuration of Blade Ring Assembly

Figure 3:
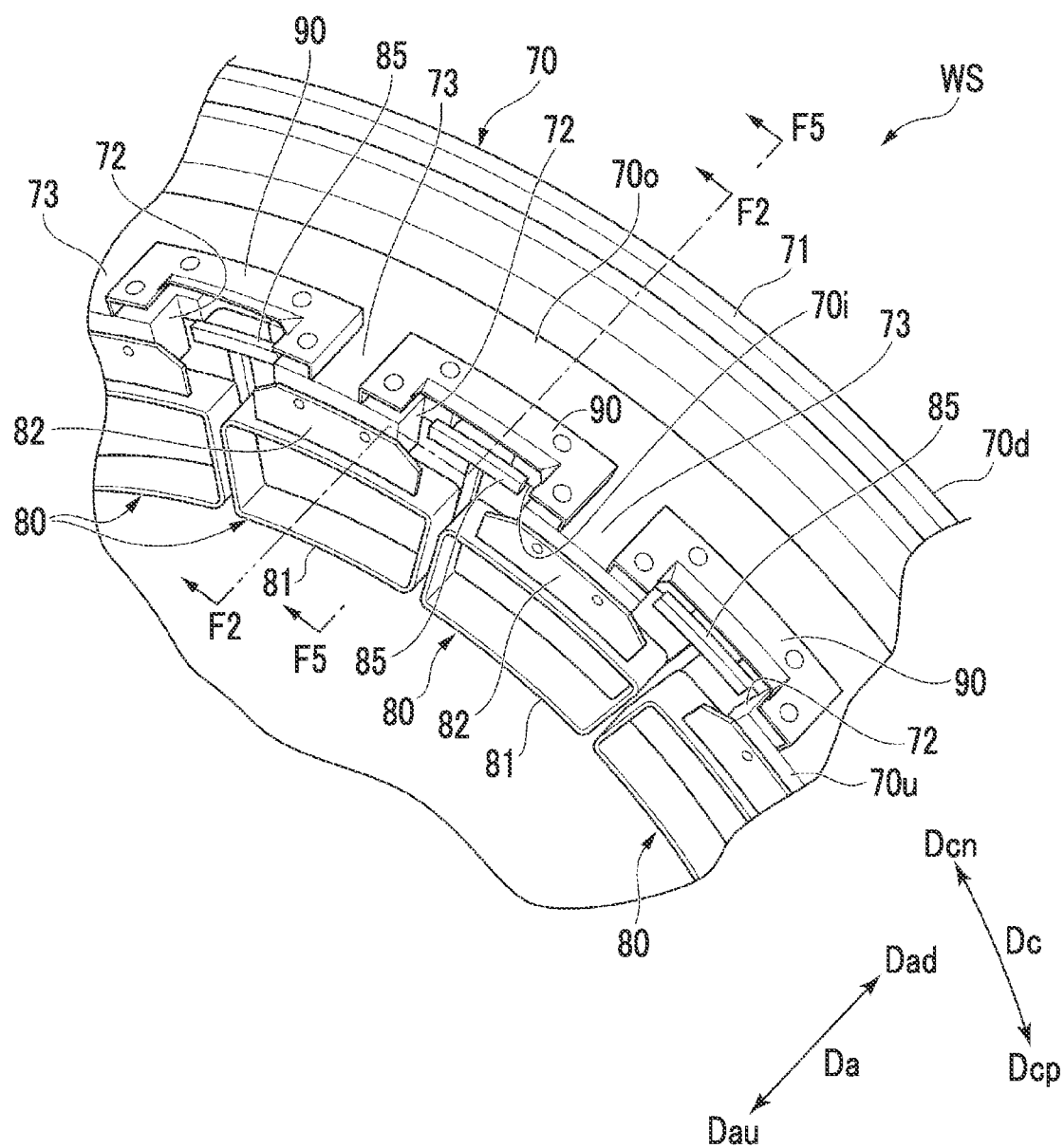
FIG. 3 is a perspective view schematically showing a portion of a blade ring assembly according to the first embodiment of the present disclosure.
Figure 5:
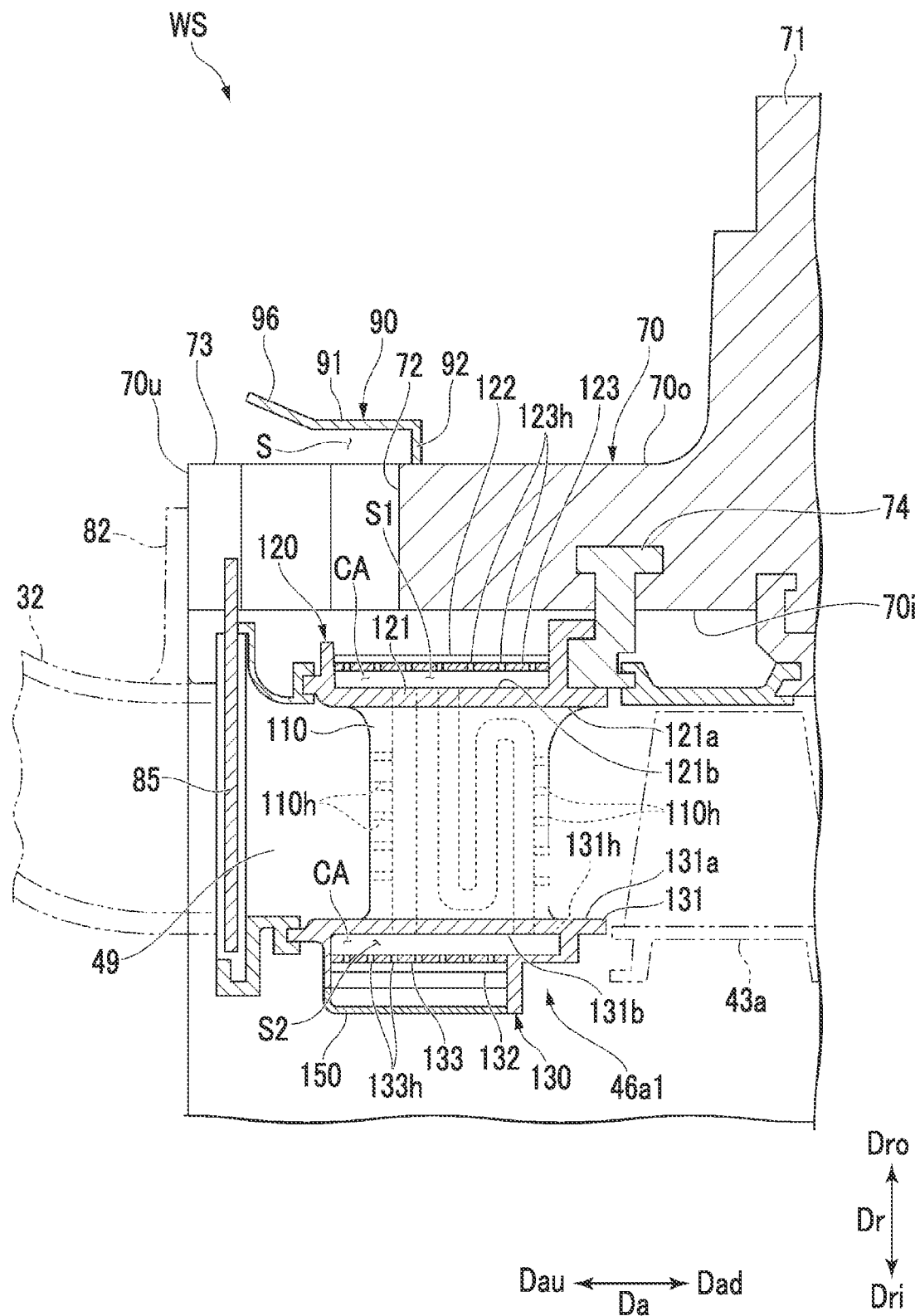
FIG. 5 is a cross-sectional view of the blade ring assembly shown in FIG. 3, which is taken along line F5-F5.

FIG. 3 is a perspective view showing a portion of the blade ring assembly WS. The blade ring assembly WS includes the turbine blade ring 70, a plurality of combustor connection members 80, a plurality of seal members 85, the plurality of stator vanes 46a1 (only one stator vane 46a1 is shown in FIG. 5), a plurality of dust separators 90, and a plurality of shielding covers 150 (only one shielding cover 150 is shown in FIG. 5).

Turbine Blade Ring

The turbine blade ring 70 extends in the circumferential direction Dc around the axis Ar and is formed in an annular shape. The turbine blade ring 70 includes an outer peripheral surface 70o, an inner peripheral surface 70i, an upstream side end surface 70u, and a downstream side end surface 70d. The outer peripheral surface 70o faces the radial outer side Dro. The outer peripheral surface 70o is exposed in the accommodation chamber C of the gas turbine casing 15. The inner peripheral surface 70i is positioned on a side opposite to the outer peripheral surface 70o and faces the radial inner side Dri. The inner peripheral surface 70i faces the plurality of stator vanes 46a1. The upstream side end surface 70u faces the axial upstream side Dau. The downstream side end surface 70d faces the axial downstream side Dad.

The turbine blade ring 70 includes the blade ring fixation portion 71 fixed to the gas turbine casing 15. The blade ring fixation portion 71 is provided at an end portion of the turbine blade ring 70 that is on the axial downstream side Dad. The blade ring fixation portion 71 is, for example, a flange projecting to the radial outer side Dro. The blade ring fixation portion 71 is positioned on the radial inner side Dri with respect to the rear wall 63 of the gas turbine casing 15 (refer to FIG. 2). The blade ring fixation portion 71 is supported by being fixed to the rear wall 63 of the gas turbine casing 15.

As shown in FIG. 3, the turbine blade ring 70 is provided with a plurality of air intake ports 72. The plurality of air intake ports 72 are provided to be separated from each other along the entire circumference of the turbine blade ring 70 at predetermined intervals in the circumferential direction Dc. The air intake ports 72 penetrate the turbine blade ring 70 over an area from the outer peripheral surface 70o to the inner peripheral surface 70i. The air intake ports 72 are positioned closer to the axial upstream side Dau than the blade ring fixation portion 71 is.

Figure 4:
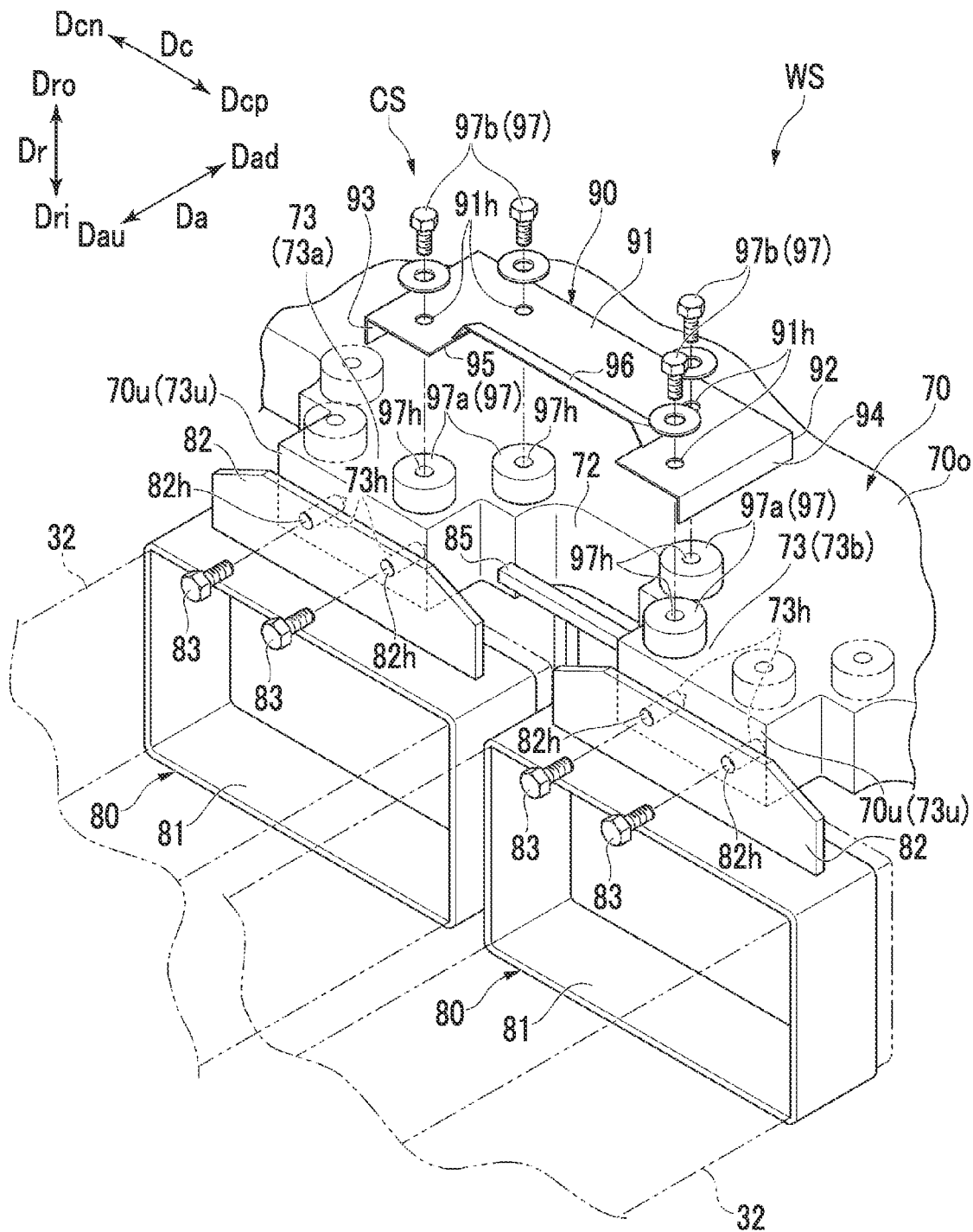
FIG. 4 is an exploded perspective view showing a portion of the blade ring assembly according to the first embodiment of the present disclosure.

FIG. 4 is a perspective view showing a portion of the blade ring assembly WS in an exploded manner. In the present embodiment, the air intake ports 72 are cutout portions (groove portions) provided at an end portion of the turbine blade ring 70 that is on the axial upstream side Dau. That is, the air intake ports 72 penetrate the turbine blade ring 70 over the area from the outer peripheral, surface 70o to the inner peripheral surface 70i and are open toward the axial upstream side Dau. Alternatively, the air intake ports 72 may be through-holes that penetrate, over the area from the outer peripheral surface 70o to the inner peripheral surface 70i, a central portion of the turbine blade ring 70 in the axial direction Da. The air intake ports 72 guide a portion of the cooling air Ac flowing through the accommodation chamber C of the gas turbine casing 15 from an outer peripheral side of the turbine blade ring 70 to an inner peripheral side of the turbine blade ring 70. The air intake ports 72 are examples of "cooling medium intake ports". In the present embodiment, the compressed air Ac compressed by the compressor 20 is an example of a "cooling medium".

In the present embodiment, the end portion of the turbine blade ring 70 that is on the axial upstream side Dau includes a plurality of protrusion portions 73. The plurality of protrusion portions 73 are disposed at different positions in the circumferential direction Dc, and each of the protrusion portions 73 protrudes toward the axial upstream side Dau. End faces of the plurality of protrusion portions 73 that are on the axial upstream side Dau form the upstream side end surface 70u of the turbine blade ring 70 described above. The plurality of protrusion portions 73 and the plurality of air intake ports 72 are alternately disposed in the circumferential direction Dc (refer to FIG. 3). Therefore, in a case where one air intake port 72 is focused on, the plurality of the protrusion portions 73 include a first protrusion portion 73a that is positioned on a side to which the circumferential direction Dcn extends with respect to the air intake port 72, and a second protrusion portion 73b that is positioned on a side to which the circumferential direction Dcp extends with respect to the air intake port 72. In other words, the air intake port 72 is positioned between the first protrusion portion 73a and the second protrusion portion 73b in the circumferential direction Dc.

Combustor Connection Member

Next, the combustor connection members 80 will be described. Each combustor connection member 80 is a fixation component to which a transition piece 32 of the combustor 30 is fixed. The plurality of combustor connection members 80 are provided at positions corresponding to the plurality of protrusion portions 73 of the turbine blade ring 70 in the circumferential direction Dc.

As shown in FIG. 4, each combustor connection member 80 includes a frame body portion 81 and a flange 82. The frame body portion 81 is a portion to which the transition piece 32 of the combustor 30 is connected. The transition piece 32 of the combustor 30 is fixed to the frame body portion 81 through, for example, welding. The flange 82 is a portion extending toward the radial outer side Dro from the frame body portion 81. The flange 82 has a planar shape extending in the circumferential direction Dc and the radial direction Dr. The flange 82 faces, in the axial direction Da, an end surface 73u of the protrusion portion 73 that is on the axial upstream side Dau. The end surface 73u of the protrusion portion 73 that is on the axial upstream side Dau is provided with joining holes 73h to which joining tools 83 such as bolts can be joined.

The flange 82 is provided with insertion holes 82h through which the joining tools 83 pass. When the joining tools 83 passing through the insertion holes 82h of the flange 82 are joined to the joining holes 73h of the protrusion portion 73, the flange 82 is fixed to the protrusion portion 73. The end surface 73u of the protrusion portion 73 including the joining holes 73h is an example of a "connecting portion" connectable to the combustor connection member 80. In the present embodiment, each of the end surfaces 73u of the first protrusion portion 73a and the second protrusion portion 73b described above includes the joining holes 73h, and the combustor connection members 80 are attached thereto.

Seal Member

Next, the seal members 85 will be described. Each seal member 85 is disposed between the transition pieces 32 of two combustors 30 adjacent to each other in the circumferential direction Dc, and tightly closes a gap between the transition pieces 32 of the two combustors 30. The seal member 85 is disposed on an inner peripheral side of the turbine blade ring 70 (refer to FIG. 5). The seal member 85 is disposed at a position overlapping with the air intake port 72 in the radial direction Dr (refer to FIGS. 5 and 6). The seal member 85 is removable to the outer peripheral side of the turbine blade ring 70 through the air intake port 72 in a state where the transition piece 32 of the combustor 30 is removed from the combustor connection member 80. The seal member 85 is an example of a "removable member".

Stator Vane

Next, the stator vanes 46a1 will be described.

FIG. 5 is a cross-sectional view of the blade ring assembly WS shown in FIG. 3, which is taken along line F5-F5. The plurality of stator vanes 46a1 (only one stator vane 46a1 is shown in FIG. 5) are disposed on the inner peripheral side of the turbine blade ring 70 and are arranged in the circumferential direction Dc. The stator vanes 46a1 are held by a holding member 74 provided at the turbine blade ring 70. Each stator vane 46a1 includes a vane body 110, an outer shroud 120, an inner shroud 130, and air paths 140.

The vane body 110 has a vane-like shape and extends in the radial direction Dr. That is, a vane height direction of the vane body 110 is the radial direction Dr. The vane body 110 is disposed inside the combustion gas flow path 49 through which the combustion gas G passes. A convex surface of surfaces facing the circumferential direction Dc in a surface of the vane body 110 forms a suction side surface (=a suction surface), and a concave surface forms a pressure side surface (=a pressure surface). An end portion of the vane body 110 that is on the axial upstream side Dau and an end portion of the vane body 110 that is on the axial downstream side Dad are provided with a plurality of exhaust holes 110h.

The outer shroud 120 is provided at an end of the vane body 110 that is on the radial outer side Dro and defines an outer peripheral-side position of the annular combustion gas flow path 49. The outer shroud 120 includes a shroud main body 121, peripheral walls 122, and a collision plate 123.

The shroud main body 121 is formed in a plate-like shape extending in the axial direction Da and the circumferential direction Dc. The shroud main body 121 includes a gas path surface 121a and an outer internal surface 121b. The gas path surface 121a is a surface that comes into contact with the combustion gas G (a surface that faces the combustion gas flow path 49) and faces the radial inner side Dri. The outer internal surface 121b is a surface facing a side opposite to the gas path surface 121a.

The peripheral, walls 122 protrude toward the radial outer side Dro from the shroud main body 121 along an outer peripheral edge of the shroud main body 121. In the present embodiment, the peripheral walls 122 are formed over the entire circumference of the outer peripheral edge of the shroud main body 121. The peripheral walls 122 include a front wall facing the axial upstream side Dau, a rear wall facing the axial downstream side Dad, a suction side wall facing the circumferential direction Dcn, and a pressure side wall (not shown) facing the circumferential direction Dcp. The outer shroud 120 includes a first space S1 which is a space surrounded by the peripheral walls 122 in four directions.

The collision plate 123 is provided in the first space S1 of the outer shroud 120 and partitions the first space S1 into a region on the radial outer side Dro and a cavity CA, which is a region on the radial inner side Dri. A plurality of air holes 123h penetrating the collision plate 123 in the radial direction Dr are formed in the collision plate 123. A portion of the cooling air Ac present on the radial outer side Dro of the stator vane 46a1 flows into the cavity CA through the air holes 123h of the collision plate 123. A portion of air flowing into the cavity CA is discharged to the combustion gas flow path 49 through exhaust holes (not shown) provided in the outer shroud 120 after the outer shroud 120 is cooled.

The inner shroud 130 is provided at an end of the vane body 110 that is on the radial inner side Dri and defines an inner peripheral-side position of the annular combustion gas flow path 49. The inner shroud 130 includes a shroud main body 131, peripheral walls 132, and a collision plate 133.

The shroud main body 131 is formed in a plate-like shape extending in the axial direction Da and the circumferential direction Dc. The shroud main body 131 includes a gas path surface 131a and an inner internal surface 131b. The gas path surface 131a is a surface that comes into contact with the combustion gas G (a surface that faces the combustion gas flow path 49) and faces the radial outer side Dro. The inner internal surface 131b is a surface facing a side opposite to the gas path surface 131a. The shroud main body 131 includes an exhaust hole 131h through which a second space S2, which will be described later, communicates with the combustion gas flow path 49.

The peripheral walls 132 protrude toward the radial inner side Dri from the shroud main body 131 along an outer peripheral edge of the shroud main body 131. In the present embodiment, the peripheral walls 132 are formed over the entire circumference of the outer peripheral edge of the shroud main body 131. The peripheral walls 132 include a front wall facing the axial upstream side Dau, a rear wall facing the axial downstream side Dad, a suction side wall facing the circumferential direction Dcn, and a pressure side wall (not shown) facing the circumferential direction Dcp. The inner shroud 130 includes the second space S2 which is a space surrounded by the peripheral walls 132 in four directions.

The collision plate 133 is provided in the second space S2 of the inner shroud 130 and partitions the second space S2 into a region on the radial inner side Dri and the cavity CA, which is a region on the radial outer side Dro. A plurality of air holes 133h penetrating the collision plate 133 in the radial direction Dr are formed in the collision plate 133. Note that the collision plate 133 may be omitted.

A plurality of the air paths 140 extend from the outer shroud 120 to the inner shroud 130 through the vane body 110. The air paths 140 adjacent to each other, which are a portion of the plurality of air paths 140, may partially communicate with each other on the radial outer side Dro or the radial inner side Dri. Any of the plurality of air paths 140 communicates with the first space S1 of the outer shroud 120. Any of the plurality of air paths 140 communicates with the second space S2 of the inner shroud 130. The air paths 140 communicate with the plurality of exhaust holes 110h of the vane body 110. The air paths 140 are examples of "cooling medium paths".

A portion of the cooling air Ac flowing into the inner peripheral side of the turbine blade ring 70 through the air intake ports 72 of the turbine blade ring 70 flows into the air holes 123h of the collision plate 123 of the outer shroud 120 and flows through the cavity CA of the outer shroud 120 so that the outer shroud 120 is cooled. Another portion of the cooling air Ac flowing into the inner peripheral side of the turbine blade ring 70 flows into the air paths 140 and cools the vane body 110 while passing through the air paths 140. A portion of the cooling air Ac flowing through the air paths 140 is discharged to the combustion gas flow path 49 through the plurality of exhaust holes 110h provided in the vane body 110. Another portion of the cooling air Ac flowing through the air paths 140 flows into the second space S2 of the inner shroud 130 and cools the inner shroud 130. The cooling air Ac flowing through the second space S2 of the inner shroud 130 is discharged to the combustion gas flow path 49 through the exhaust hole 131h of the inner shroud 130.

Dust Separator

Next, the dust separators 90 will be described.

As shown in FIG. 3, the plurality of dust separators 90 are disposed on the outer peripheral side of the turbine blade ring 70. The plurality of dust separators 90 are disposed to be separated from each other in the circumferential direction Dc and are positioned corresponding to the plurality of air intake ports 72. The dust separators 90 and the turbine blade ring 70 are formed of the same material (for example, stainless steel) and have the same thermal expansion coefficient as each other. The dust separators 90 are examples of "outer peripheral side components". The dust separators 90 are examples of "outer peripheral side covers" and are examples of "foreign substance separation covers".

As shown in FIG. 4, each dust separator 90 is disposed over a region between the first protrusion portion 73a and the second protrusion portion 73b on both sides with respect to the corresponding air intake port 72. The dust separator 90 includes a ceiling wall 91, a rear wall 92, a first side wall 93, and a second side wall 94.

Figure 6:
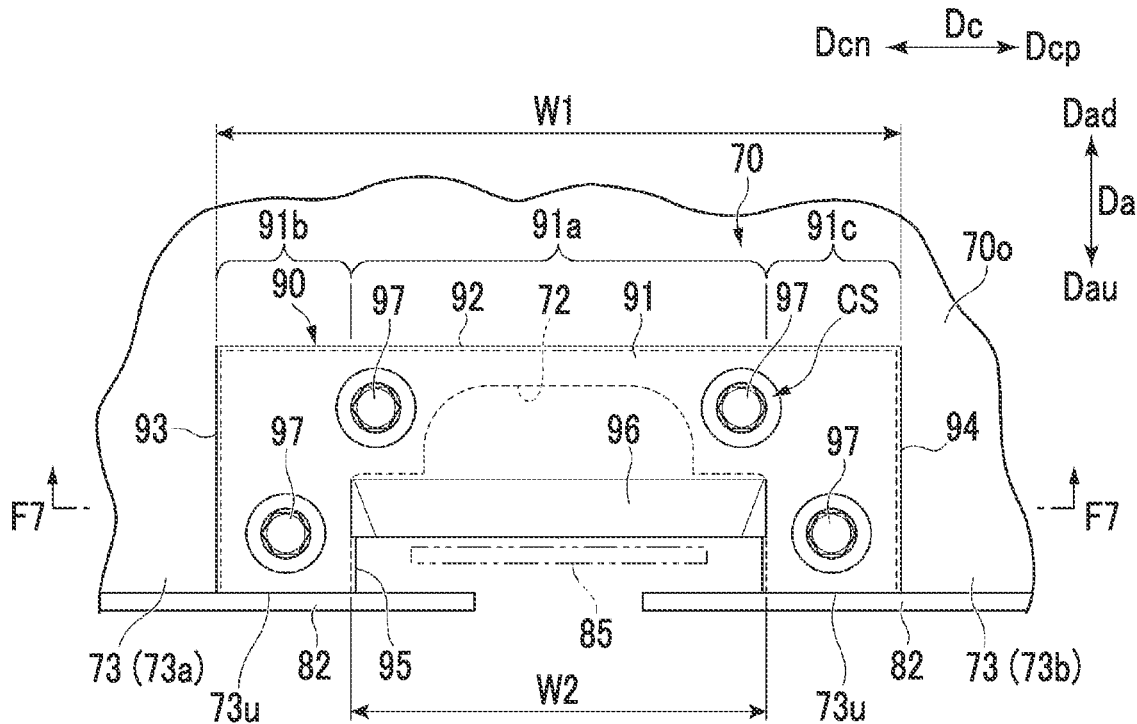
FIG. 6 is a plan view illustrating a dust separator according to the first embodiment of the present disclosure.

FIG. 6 is a plan view showing the dust separator 90.

The ceiling wall 91 extends to be parallel with the outer peripheral surface 70o of the turbine blade ring 70 with a gap provided between the ceiling wall 91 and the outer peripheral surface 70o of the turbine blade ring 70. That is, the ceiling wall 91 has a gentle arc-like shape extending along the outer peripheral surface 70o of the turbine blade ring 70. The ceiling wall 91 covers at least a portion of the air intake port 72 from the outer peripheral side of the turbine blade ring 70. In the present embodiment, a width W1 of the ceiling wall 91 in the circumferential direction Dc of is larger than a maximum width W2 of the air intake port 72 in the circumferential direction Dc. The ceiling wall 91 extends, to a position closer to the axial downstream side Dad than the air intake port 72 is, from a position closer to the axial upstream side Dau than a portion of the air intake port 72 is. The ceiling wall 91 is an example of a "first wall portion".

In the present embodiment, the ceiling wall 91 covers only a portion of the air intake port 72 without covering the entire air intake port 72. More specifically, the ceiling wall 91 is disposed in a region that does not overlap with the seal member 85 in the radial direction Dr. For example, the ceiling wall 91 includes a cutout portion 95 in a region that overlaps with the seal member 85 in the radial direction Dr. When the seal member 85 is to be removed, the seal member 85 can be removed to the outer peripheral side of the turbine blade ring 70 along the radial direction Dr through an inner side of the air intake port 72 and the cutout portion 95.

More specifically, the ceiling wall 91 includes a first region 91a, a second region 91b, and a third region 91c. The first region 91a is a region covering the air intake port 72. The first region 91a is provided closer to the axial downstream side Dad than the end surfaces 73u of the protrusion portions 73 in the axial direction Da are. The second region 91b is disposed, with respect to the first region 91a, on a side to which the circumferential direction Dcn extends. The third region 91c is disposed, with respect to the first region 91a, on a side to which the circumferential direction Dcp extends. The second region 91b and the third region 91c protrude to be closer to the axial upstream side Dau than the first region 91a is. Accordingly, a region surrounded by the first region 91a, the second region 91b, and the third region 91c is the cutout portion 95.

The first region 91a of the ceiling wall 91 includes an inclined portion 96. The inclined portion 96 is provided at a portion of the first region 91a of the ceiling wall 91 that is on the axial upstream side Dau. The inclined portion 96 is inclined in such a direction that the inclined portion 96 becomes farther from the outer peripheral surface 70o of the turbine blade ring 70 toward the axial upstream side Dau (refer to FIG. 5).

The rear wall 92 extends toward the outer peripheral surface 70o of the turbine blade ring 70 from an end portion of the ceiling wall 91 that is on the axial downstream side Dad. The rear wall 92 extends in the circumferential direction Dc. The rear wall 92 covers at least a portion of a space S (refer to FIG. 5 (hereinafter, referred to as an "internal space S")) between the ceiling wall 91 and the air intake port 72 from the axial downstream side Dad. In the present embodiment, the rear wall 92 is in contact with the turbine blade ring 70. That is, there is no gap between the rear wall 92 and the outer peripheral surface 70o of the turbine blade ring 70. Alternatively, a gap (for example, a gap of which the size is smaller than the plate thickness of the ceiling wall 91) may be present between the rear wall 92 and the outer peripheral surface 70o of the turbine blade ring 70. The rear wall 92 is an example of a "second wall portion".

Figure 7:
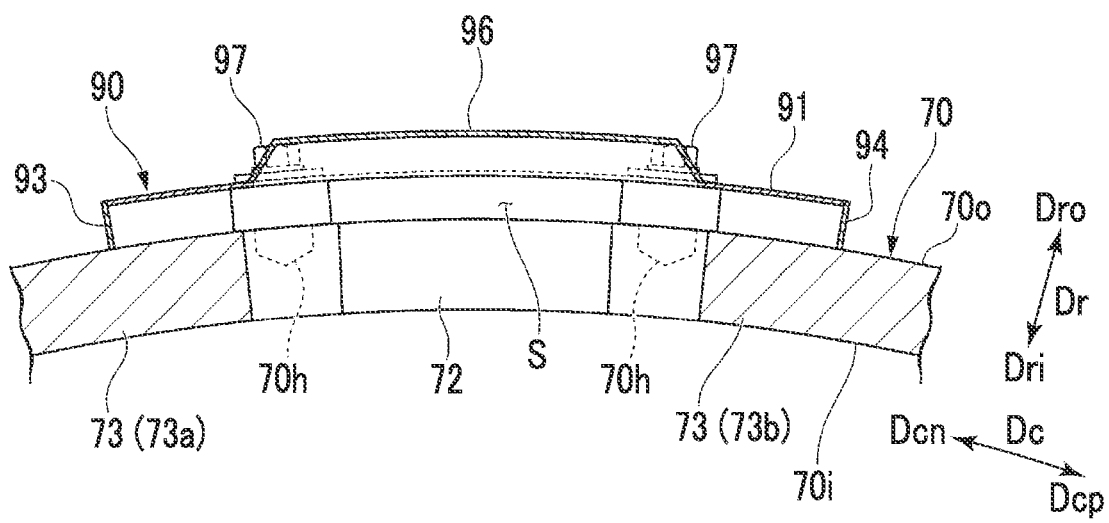
FIG. 7 is a front view showing the dust separator according to the first embodiment of the present disclosure.

FIG. 7 is a front view showing the dust separator 90.

The first side wall 93 extends toward the outer peripheral surface 70o of the turbine blade ring 70 from an end portion of the ceiling wall 91 that is on the side to which the circumferential direction Dcn extends in the circumferential direction Dc. The first side wall 93 extends in the axial direction Da. For example, the first side wall 93 extends to be closer to the axial upstream side Dau than a portion of the cutout portion 95 is. In addition, the first side wall 93 extends to be closer to the axial downstream side Dad than the air intake port 72 is and is connected to the rear wall 92. The first side wall 93 covers at least a portion of the internal space S of the dust separator 90 from the side to which the circumferential direction Dcn extends. In the present embodiment, the first side wall 93 is in contact with the turbine blade ring 70. That is, there is no gap between the first side wall 93 and the outer peripheral surface 70o of the turbine blade ring 70. Alternatively, a gap (for example, a gap of which the size is smaller than the plate thickness of the ceiling wall 91) may be present between the first side wall 93 and the outer peripheral surface 70o of the turbine blade ring 70. The first side wall 93 is an example of a "third wall portion".

The second side wall 94 extends toward the outer peripheral surface 70o of the turbine blade ring 70 front an end portion of the ceiling wall 91 that is on the side to which the circumferential direction Dcp extends in the circumferential direction Dc. The second side wall 94 extends in the axial direction Da. For example, the second side wall 94 extends to be closer to the axial upstream side Dau than a portion of the cutout portion 95 is. In addition, the second side wall 94 extends to be closer to the axial downstream side Dad than the air intake port 72 is and is connected to the rear wall 92. The second side wall 94 covers at least a portion of the internal space S of the dust separator 90 from the side to which the circumferential direction Dcp extends. In the present embodiment, the second side wall 94 is in contact with the turbine blade ring 70. That is, there is no gap between the second side wall 94 and the outer peripheral surface 70o of the turbine blade ring 70. Alternatively, a gap (for example, a gap of which the size is smaller than the plate thickness of the ceiling wall 91) may be present between the second side wall 94 and the outer peripheral surface 70o of the turbine blade ring 70. The second side wall 94 is an example of a "fourth wall portion".

Due to the above-described configuration, the internal space S of the dust separator 90 is surrounded by the ceiling wall 91, the rear wall 92, the first side wall 93, and the second side wall 94. Meanwhile, the internal space S of the dust separator 90 is open to the axial upstream side Dau.

Next, a connection structure CS for fixation of the dust separator 90 will be described.

As shown in FIG. 4, the connection structure CS includes a plurality of (for example, four) connection portions 97. Each connecting portion 97 includes a supporting portion 97a fixed to the outer peripheral surface 70o of the turbine blade ring 70, and a joining tool 97b detachably attached to the supporting portion 97a. The supporting portion 97a is, for example, a boss provided on the outer peripheral surface 70o of the turbine blade ring 70 and includes an engagement hole 97h open to the radial outer side Dro. The ceiling wall 91 of the dust separator 90 is placed on the supporting portions 97a. The ceiling wall 91 includes an insertion hole 91h into which the joining tools 97h can be inserted, the insert ion holes 91h being provided at positions corresponding to the engagement holes 97h. The joining tools 97b are, for example, bolts and are engaged with the engagement holes 97h of the supporting portions 97a through the insertion holes 91h of the ceiling wall 91 of the dust separator 90. Since the joining tools 97b are engaged with the engagement holes 97h, the dust separator 90 is detachably connected to the outer peripheral surface 70o of the turbine blade ring 70.

Shielding Cover

Figure 8:
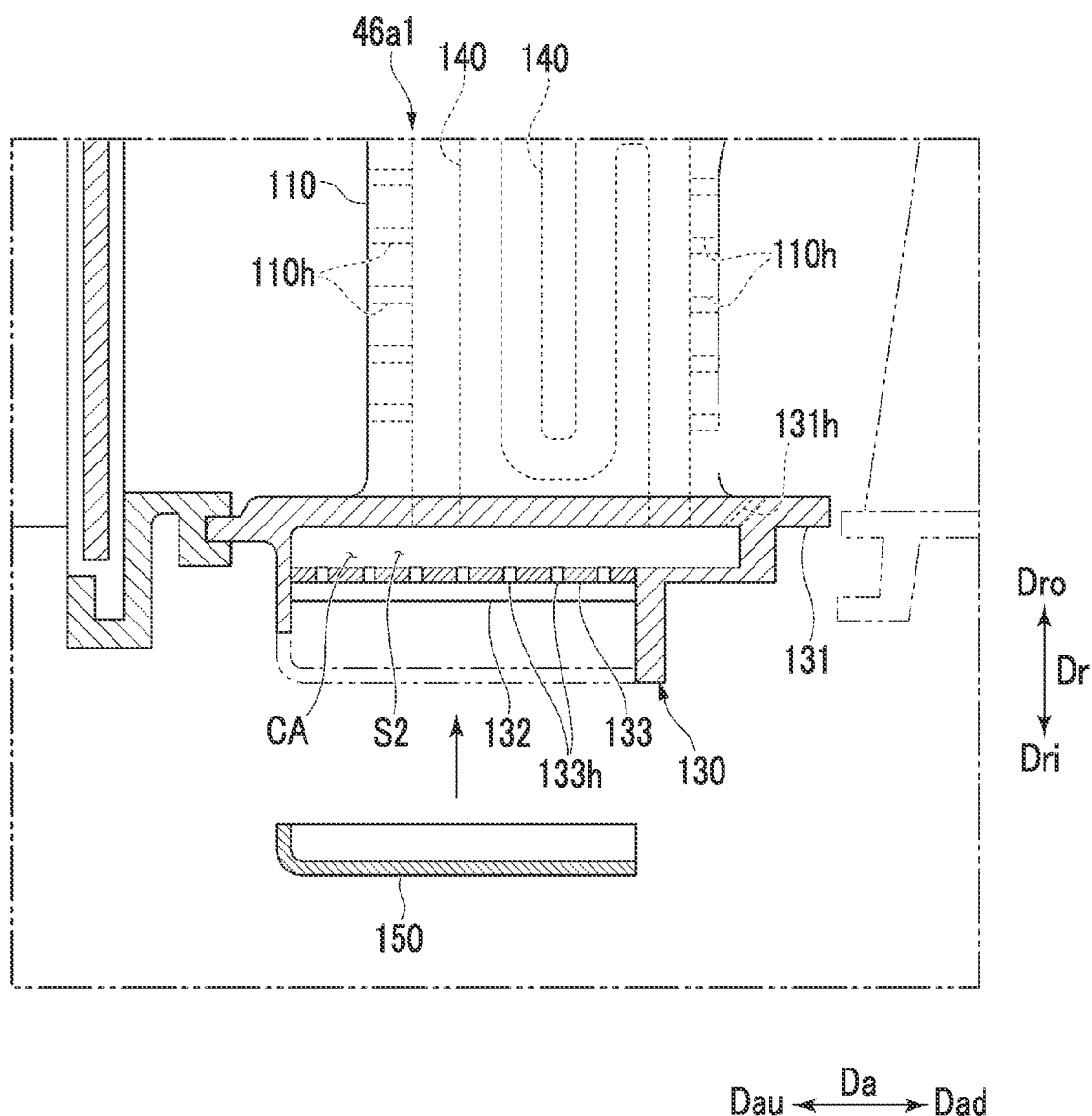
FIG. 8 is a cross-sectional view showing a shielding cover according to the first embodiment of the present disclosure.

FIG. 8 is a cross-sectional view showing the shielding cover 150. The shielding cover 150 is attached to the inner shroud 130 and is fixed to the inner shroud 130 through welding or the like. The shielding cover 150 covers at least a portion of the second space S2 of the inner shroud 130 from the radial inner side Dri. In the present embodiment, the shielding cover 150 is attached to the peripheral walls 132 of the inner shroud 130 and covers the entire second space S2 of the inner shroud 130. Since the shielding cover 150 is attached to the inner shroud 130, the compressed air Ac is not supplied to the second space S2 of the inner shroud 130 from the radial inner side Dri. Into the second space S2 of the inner shroud 130, the compressed air Ac that has flowed through the air intake port 72 of the turbine blade ring 70 and that has flowed through the outer shroud 120 and the air paths 140 of the vane body 110 is supplied. The shielding cover 150 is an example of an "inner peripheral side cover".

Method for Refurbishing Gas Turbine

Next, an example of a method for refurbishing the gas turbine 10 will be described. Here, a refurbishing method in which the dust separator 90 and the shielding cover 150 are added to the gas turbine 10 provided with no dust separator 90 and no shielding cover 150 will be described. Note that, in a refurbishing method in which the shielding cover 150 is added to the gas turbine 10 in which the dust separator 90 has been already installed, a dust separator attachment step (S12) which will be described later is omitted.

Figure 9:
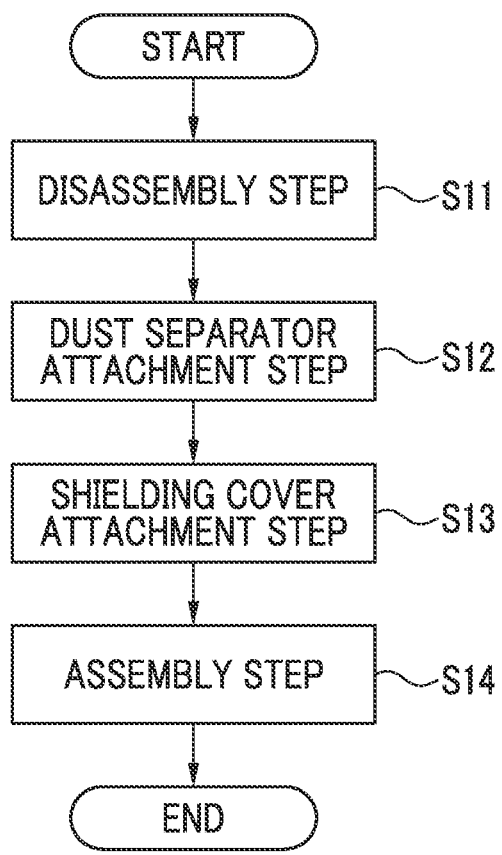
FIG. 9 is a flowchart showing a procedure for a method for refurbishing a gas turbine according to the first embodiment of the present disclosure.

FIG. 9 is a flowchart showing the procedure for a method for refurbishing the gas turbine 10. The refurbishing method of the present embodiment includes, for example, a disassembly step (S11), the dust separator attachment step (S12), a shielding cover attachment step (S13), and an assembly step (S14).

In the disassembly step (S11), a necessary portion of the gas turbine 10 is disassembled. For example, the gas turbine casing 15 is disassembled and the blade ring assembly WS is extracted. Furthermore, regarding the blade ring assembly WS, the plurality of stator vanes 46a1 are removed from the turbine blade ring 70.

In the dust separator attachment step (S12), the dust separators 90 are attached to the turbine blade ring 70. Specifically, hole portions 70h (refer to FIG. 7) for fixation of the supporting portions 97a are provided in the outer peripheral surface 70o of the turbine blade ring 70, and the supporting portions 97a are fixed to the outer peripheral surface 70o of the turbine blade ring 70. Next, the dust separators 90 are placed on the supporting portions 97a. Next, the joining tools 97b are joined to the engagement holes 97h of the supporting portions 97a through the insertion holes 91h of the ceiling walls 91 of the dust separators 90. Accordingly, the dust separators 90 are attached to the outer peripheral side of the turbine blade ring 70.

In the shielding cover attachment step (S13), the shielding cover 150 is attached to the inner shroud 130 of each stator vane 46a1. For example, the shielding cover 150 is attached to the inner shroud 130 by being welded and fixed to the peripheral walls 62 of the inner shroud 130. Accordingly, the second space S2 of the inner shroud 130 is closed by the shielding cover 150.

In the assembly step (S14), the gas turbine 10 is assembled. Specifically, the plurality of stator vanes 46a1 to which the shielding covers 150 are respectively attached are attached to the inner peripheral side of the turbine blade ring 70. Next, the gas turbine casing 15 is assembled on the outer peripheral side of the turbine blade ring 70. Accordingly, the refurbishing of the gas turbine 10 is finished.

Operation and Effect

Next, the operation and effect of the dust separator 90 will be described.

As shown in FIG. 2, the compressed air Ac compressed by the compressor 20 is supplied from the compressor 20 to the accommodation chamber C in which the combustor 30 is disposed. The angle of a direction in which the compressed air Ac supplied to the accommodation chamber C flows is changed by the guide portion 64, and the compressed air Ac flows toward the peripheral wall 62 of the gas turbine casing 15. Then, the compressed air Ac colliding with the peripheral wall 62 is divided into two parts. That is, a direction in which a portion (for example, most of) of the compressed air Ac flows is changed to a direction toward the intake portion 31 of the combustor 30, and thus, the portion of the compressed air Ac flows to the intake portion 31 of the combustor 30 (refer to an arrow A1 in FIG. 2). Meanwhile, a direction in which another portion of the compressed air Ac flows is changed such that the other portion of the compressed air Ac flows along the rear wall 63 from the peripheral wall 62 after collision with the peripheral wall 62 of the gas turbine casing 15 (refer to an arrow A2 in FIG. 2). As a result, inside the accommodation chamber C, a vortex flow (counter vortex) V, in which the compressed air Ac flows from the axial downstream side Dad to the axial upstream side Dau in a space positioned on the radial outer side Dro with respect to the turbine blade ring 70, is generated. Then, a portion of the compressed air Ac flowing in the vortex flow V is taken into the inner peripheral side of the turbine blade ring 70 through the air intake ports 72 of the turbine blade ring 70.

Figure 10:
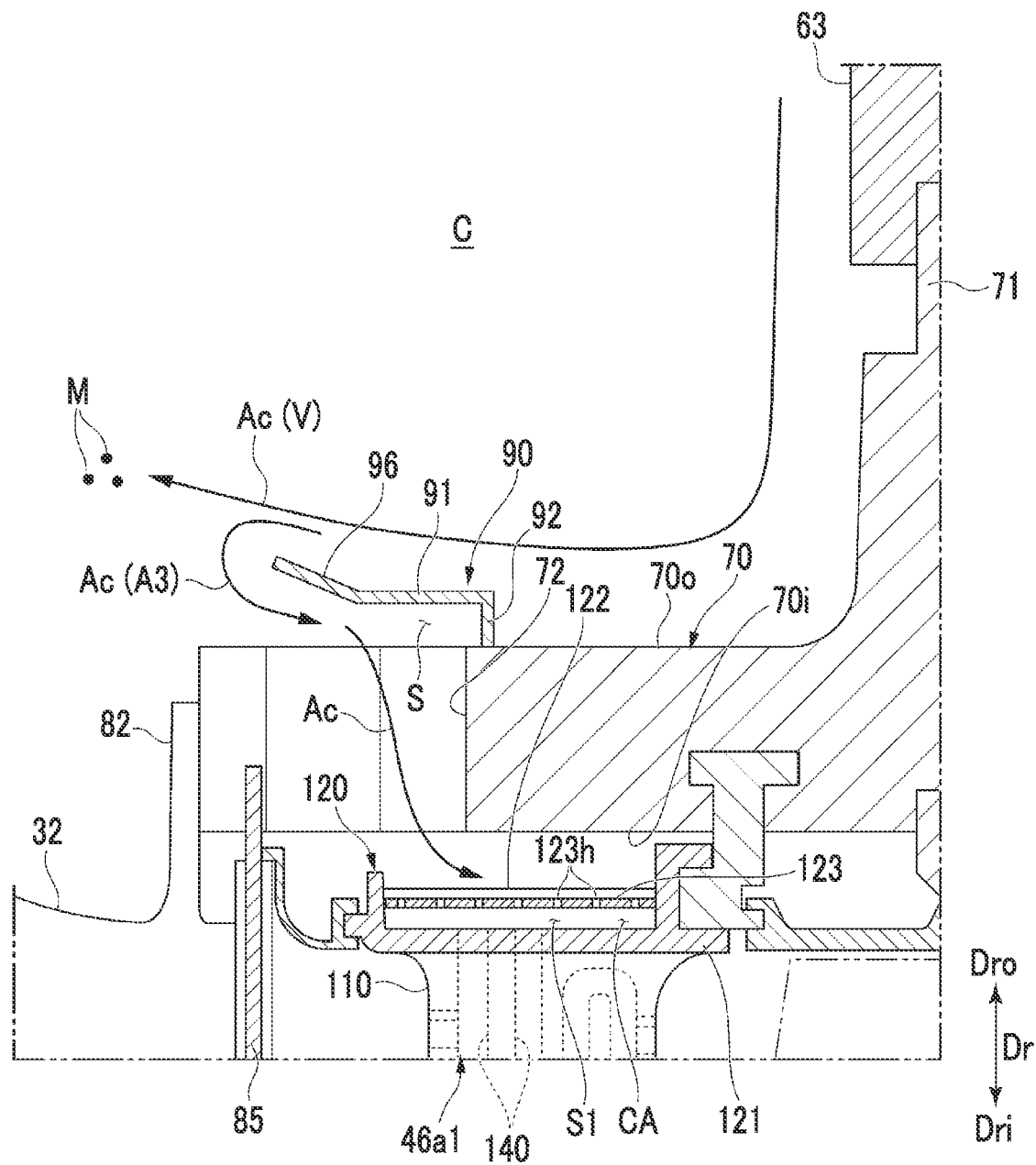
FIG. 10 is a cross-sectional view showing an operation of the dust separator according to the first embodiment of the present disclosure.

FIG. 10 is a cross-sectional view showing the operation of the dust separator 90.

In the present embodiment, the dust separator 90 is provided on the outer peripheral side of the turbine blade ring 70. The dust separator 90 includes the ceiling wall 91 that covers at least a portion of the air intake port 72 from the outer peripheral side of the turbine blade ring 70 and the rear wall 92 that covers the internal space S of the dust separator 90 from the axial downstream side Dad. Therefore, the compressed air Ac flowing along the rear wall 63 of the gas turbine casing 15 does not flow directly into the air intake port 72, and the compressed air Ac turns at an angle exceeding 90 degrees (for example, at an angle of approximately 180 degrees) and flows into the air intake port 72 after flowing through, in a direction from the axial downstream side Dad to the axial upstream side Dau, a space that is positioned on the radial outer side Dro with respect to the dust separator 90 (refer to an arrow A3 in FIG. 10). During such a process, a foreign substance M (for example, rust or dust) contained in the compressed air Ac flows to a position closer to the axial upstream side Dau than the air intake port 72 is due to the inertial force of the foreign substance M. Therefore, the foreign substance M contained in the compressed air Ac is less likely to enter the air intake port 72. As a result, a cooling structure (for example, the exhaust holes 110$h$ of the vane body 110 or the exhaust hole 131$h$ of the inner shroud 130) for the stator vane 46$a$1 is made less likely to be clogged with the foreign substance M.

The foreign substance M flowing to the position closer to the axial upstream side Dau than the air intake port 72 is due to the inertial force is taken into the combustor 30 through the intake portion 31 of the combustor 30 and is discharged to the outside of the gas turbine 10 in a state of being contained in the combustion gas G. The combustion gas flow path 49 includes a smaller number of small holes which are clogged by a foreign substance in comparison with the stator vane 46$a$1, or the combustion gas flow path 49 includes no such small holes. Therefore, problems due to the foreign substance M are unlikely to occur.

Second Embodiment

Next, a second embodiment will be described. The second embodiment is different from the first embodiment in that the blade ring assembly WS includes L-shaped pipes 290 instead of the dust separators 90. Note that the second embodiment is the same as the first embodiment except for configurations described below.

Turbine Blade Ring

Figure 11:
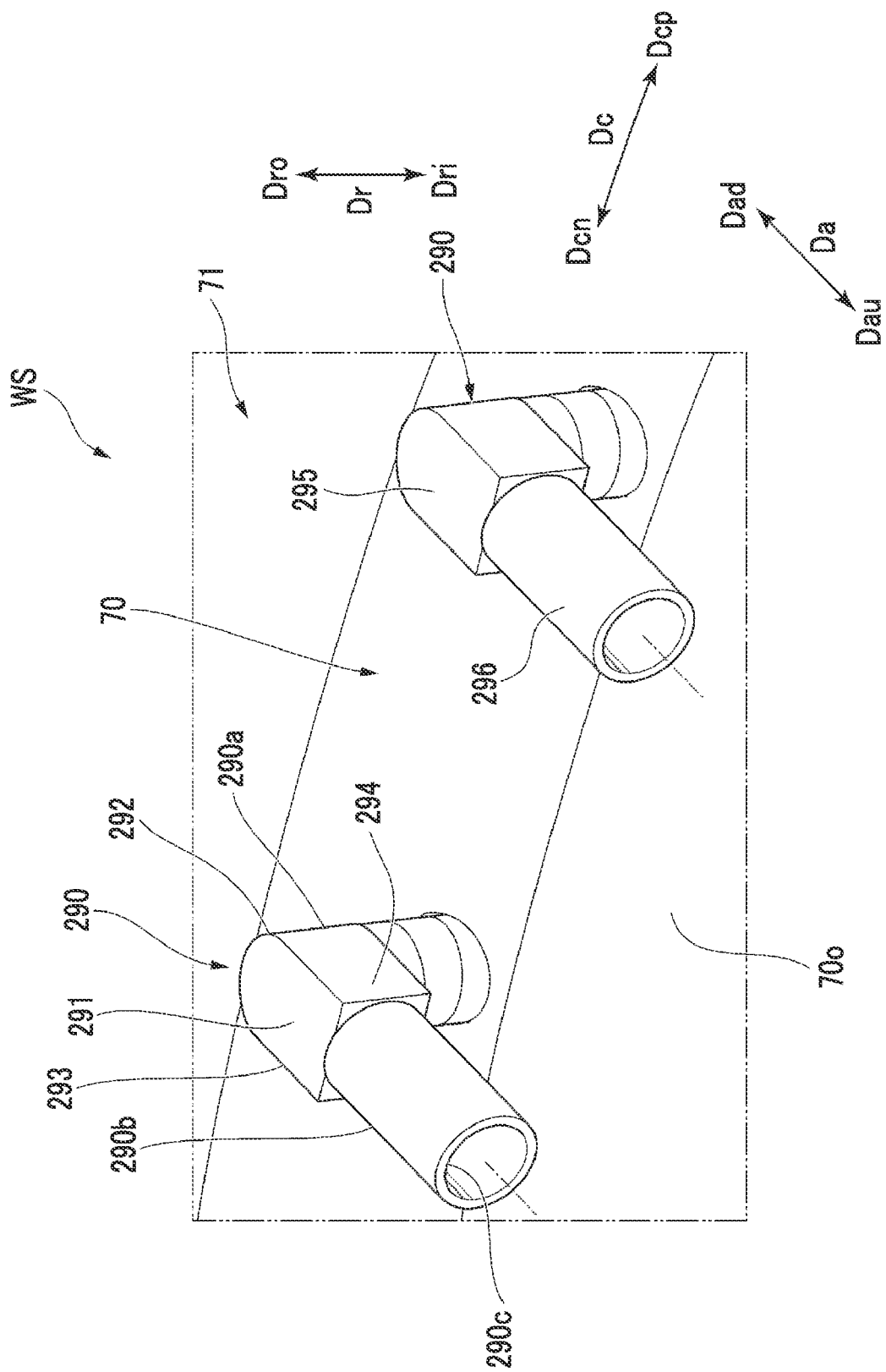
FIG. 11 is a perspective view schematically showing a portion of a blade ring assembly according to a second embodiment of the present disclosure.

FIG. 11 is a perspective view schematically showing a portion of the blade ring assembly WS according to the second embodiment of the present disclosure.

Figure 12:
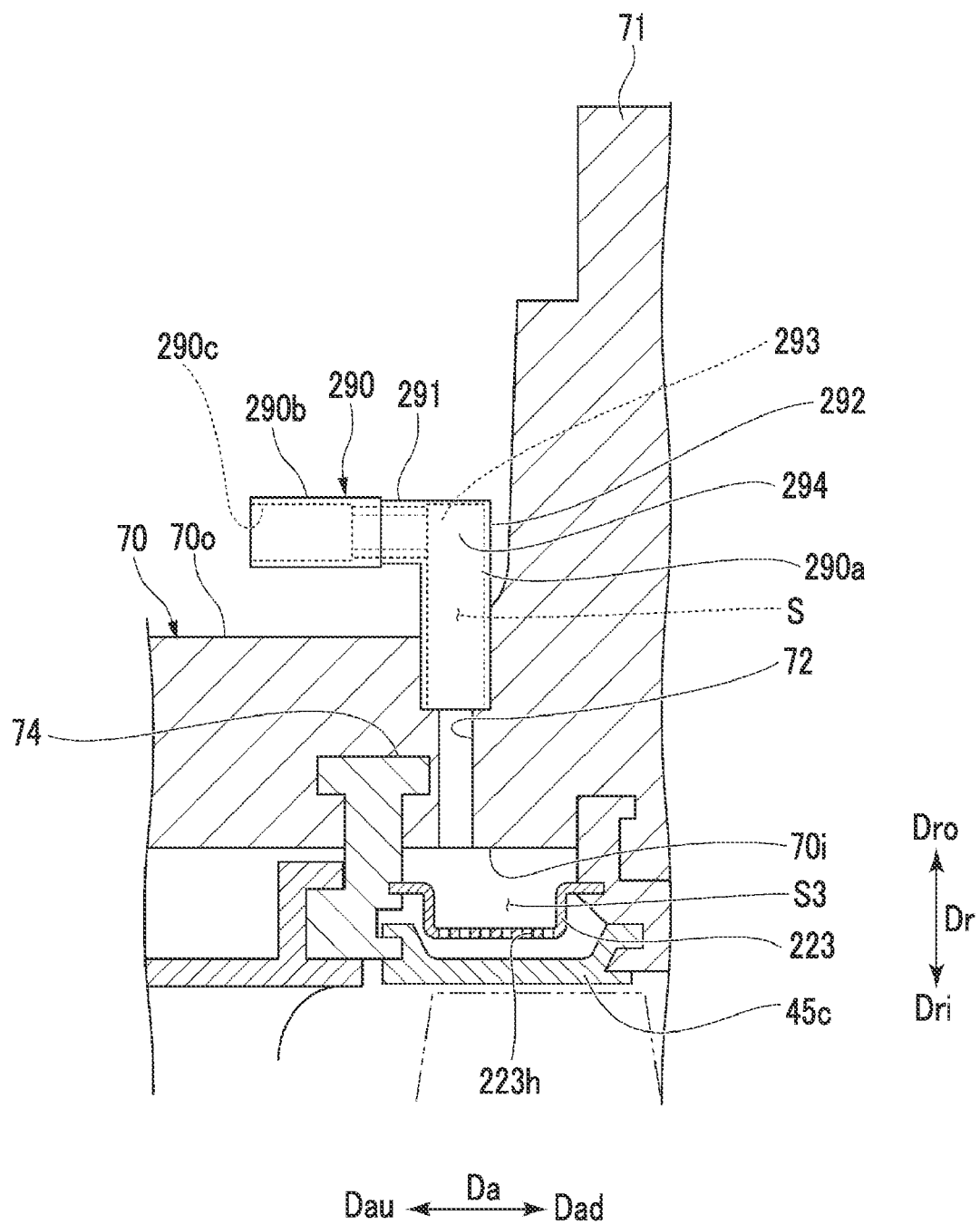
FIG. 12 is an enlarged cross-sectional view schematically showing a portion of the blade ring assembly according to the second embodiment of the present disclosure.

FIG. 12 is an enlarged cross-sectional view schematically showing a portion of the blade ring assembly WS according to the second embodiment of the present disclosure.

As shown in FIGS. 11 and 12, the air intake ports 72 are formed in the outer peripheral surface 70$o$ on the axial downstream side Dad close to the blade ring fixation portion 71 of the turbine blade ring 70. The air intake ports 72 are provided at positions overlapping with, in the radial direction Dr, the ring segment 45$c$ that is positioned between the stator vanes 46$a$ of the first stage and the second stage in the axial direction Da.

A second collision plate 223 is provided in a third space S3 between the ring segment 45$c$ that overlaps with the air intake ports 72 in the radial direction Dr and the inner peripheral surface 70$i$ of the turbine blade ring 70. The second collision plate 223 partitions the third space S3 into a region on the radial outer side Dro and a region on the radial inner side Dri. A plurality of second air holes 223$h$ penetrating the second collision plate 223 in the radial direction Dr are formed in the second collision plate 223. The second collision plate 223 and the ring segment 45$c$ that overlaps with the second collision plate 223 in the radial direction Dr are disposed on the inner peripheral side of the turbine blade ring 70 and are examples of the "cooling target components".

L-Shaped Pipe

The L-shaped pipes 290 are disposed on the outer peripheral side of the turbine blade ring 70. More specifically, the L-shaped pipes 290 are provided at positions overlapping with the air intake ports 72 of the outer peripheral surface 70$o$ of the turbine blade ring 70. The L-shaped pipes 290 are formed of, for example, the same material as the turbine blade ring 70. The L-shaped pipes 290 and the turbine blade ring 70 are formed of a metallic material such as stainless steel. Each of the L-shaped pipes 290 is formed in an L-like shape as seen in the circumferential direction Dc. Each of the L-shaped pipes 290 includes a first pipe portion 290$a$ and a second pipe portion 290$b$.

The first pipe portion 290$a$ extends in the radial direction Dr of the turbine blade ring 70 from the cooling medium intake port 72.

The second pipe portion 290$b$ extends to a side opposite to the axial downstream side Dad from an end portion of the first pipe portion 290$a$ that is on a side opposite to the turbine blade ring 70. In the present embodiment, the second pipe portion 290$b$ extends from the first pipe portion 290$a$ toward the axial upstream side Dau, which is one of both sides in the axial direction Da. The second pipe portion 290$b$ may be inclined with respect to the axis Ar, for example, at an angle equal to or smaller than an angle of ±10 degrees. The second pipe portion 290$b$ communicates with the first pipe portion 290$a$ and includes an opening portion 290$c$ that is on a side opposite to the first pipe portion 290$a$. The opening portion 290$c$ is open toward the axial upstream side Dau.

From another viewpoint, the L-shaped pipe 290 having the above-described shape includes a ceiling wall 291, a rear wall 292, a first side wall 293, and a second side wall 294.

The ceiling wall 291 extends along the outer peripheral surface 70o of the turbine blade ring 70 with a gap provided between the ceiling wall 291 and the outer peripheral surface 70o of the turbine blade ring 70. The ceiling wall 291 covers at least a portion of the air intake port 72 from the outer peripheral side of the turbine blade ring 70. In the present embodiment, the ceiling wall 291 covers the entire air intake port 72 from the outer peripheral side of the turbine blade ring 70. The ceiling wall 291 extends to be closer to the axial upstream side Dau than the air intake port 72 is, the axial upstream side Dau being one of both sides in the axial direction Da. The ceiling wall 291 is an example of the "first wall portion".

The rear wall 292 extends toward the outer peripheral surface 70o of the turbine blade ring 70 from an end portion of the ceiling wall 291 that is on the axial downstream side Dad. The rear wall 292 extends toward the outer peripheral surface 70o of the turbine blade ring 70 from an end portion of the ceiling wall 291 that is on the axial downstream side Dad. The rear wall 292 covers at least a portion of the space S between the ceiling wall 291 and the air intake port 72 from the axial downstream side Dad. In the present embodiment, the rear wall 292 covers the entire space S between the ceiling wall 291 and the air intake port 72 from the axial downstream side Dad. The rear wall 292 is an example of the "second wall portion".

The first side wall 293 extends toward the outer peripheral surface 70o of the turbine blade ring 70 from an end portion of the ceiling wall 291 that is on the side to which the circumferential direction Dcn extends in the circumferential direction Dc. The first side wall 293 covers at least a portion of the space S between the ceiling wall 291 and the air medium intake port 72 in the circumferential direction Dcn. The first side wall 293 is formed in an L-like shape as seen in the circumferential direction Dc. The first side wall 293 is an example of the "third wall portion".

The second side wall 294 extends toward the outer peripheral, surface 70c of the turbine blade ring 70 from an end portion of the ceiling wall 291 that is on the side to which the circumferential direction Dcp extends in the circumferential direction Dc. The second side wall 294 covers at least a portion of the space S between the ceiling wall 291 and the air medium intake port 72 in the circumferential direction Dcp. The second side wall 294 is formed in an L-like shape as seen in the circumferential direction Dc. The second side wall 294 is another example of the "third wall portion".

Figure 13:
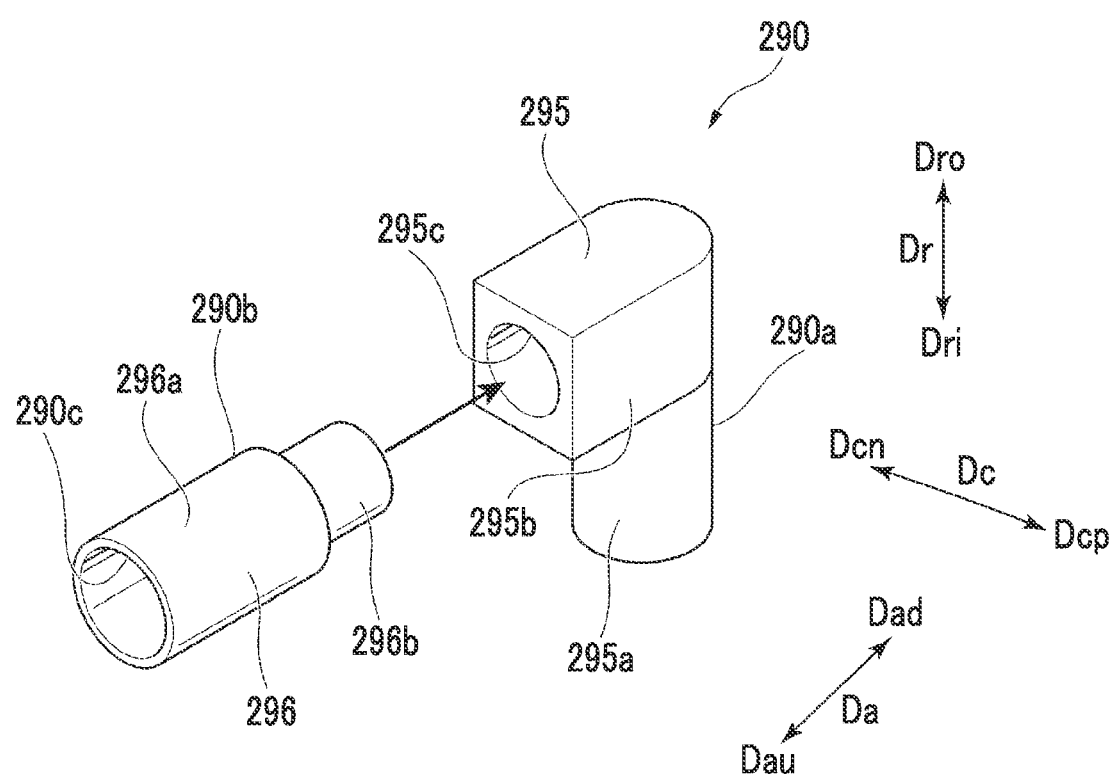
FIG. 13 is an exploded perspective view showing an L-shaped pipe according to the second embodiment of the present disclosure.

FIG. 13 is an exploded perspective view showing the L-shaped pipe 290 according to the second embodiment of the present disclosure.

Additionally, from another viewpoint, the L-shaped pipe 290 includes an elbow pipe 295 and a detachable pipe 296 as shown in FIG. 13.

Elbow Pipe

The elbow pipe 295 includes a cylindrical portion 295a and a connecting portion 295b. The cylindrical portion 295a is a pipe extending in the radial direction Dr.

An end portion of the cylindrical portion 295a that is on the radial inner side Dri is open. An end portion of the cylindrical portion 295a that is on the radial outer side Dro is closed. The cylindrical portion 295a is inserted into the air intake port 72. The entire circumference of the cylindrical portion 295a is welded to the turbine blade ring 70 in a state of being screwed into the air intake port 72, for example. An end portion on the radial outer side Dro of a side surface on the axial upstream side Dau of the cylindrical portion 295a is provided with the connecting portion 295b.

The connecting portion 295b is formed in a tubular shape extending in the axial direction Da. The outer shape of the connecting portion 295b is formed in a quadrangular tubular shape, and an inner peripheral surface of the connecting portion 295b is formed in a circular shape as seen in the axial direction Da. The connecting portion 295b communicates with the cylindrical portion 295a. The connecting portion 295b is open toward the axial upstream side Dau. Art opening portion of the connecting portion 295b that is on the axial upstream side Dau will be referred to as an elbow opening portion 295c.

The detachable pipe 296 is connected to the elbow opening portion 295c of the elbow pipe 295. The detachable pipe 296 includes a large-diameter pipe 296a and an orifice portion 296b.

The large-diameter pipe 296a is disposed at a position on the axial upstream side Dau that is separated from the elbow pipe 295 pipe. The large-diameter pipe 296a is formed in a cylindrical shape extending in the axial direction Da. Both end portions of the large-diameter pipe 296a in the axial direction Da are open. An opening portion on the axial upstream side Dau, which is one of opening portions of the large-diameter pipe 296a, is the opening portion 290c of the L-shaped pipe 290 described above.

The orifice portion 296b is provided at an end portion of the large-diameter pipe 296a that is on the axial downstream side Dad. The orifice portion 296b is formed in a cylindrical shape extending in the axial direction Da. A central axis of the orifice portion 296b coincides with a central axis of the large-diameter pipe 296a.

The outer diameter dimension of the orifice portion 296b is smaller than the outer diameter dimension of the large-diameter pipe 296a, and the inner diameter dimension of the orifice portion 296b is smaller than the inner diameter dimension of the large-diameter pipe 296a. That is, the inner diameter of the orifice portion 296b is smaller than the inner diameter of the opening portion 290c of the L-shaped pipe 290 that is on the axial upstream side Dau. The orifice portion 296b is formed as if the orifice portion 296b has been inserted into the large-diameter pipe 296a. The orifice portion 296b is integrally formed with the large-diameter pipe 296a.

The orifice portion 296b is inserted into the elbow opening portion 295c of the elbow pipe 295. A parallel screw thread (not shown) is formed on an outer peripheral surface of the orifice portion 296b. A parallel screw groove (not shown) is formed on an inner peripherical surface of the connecting portion 295b of the elbow pipe 295. The orifice portion 296b is point-welded to the elbow pipe 295 in a state of being screwed into, for example, the elbow opening portion 295c.

Additionally, the orifice portion 296b is formed such that the flow path area thereof is smaller than that of the other portion of the L-shaped pipe 290. In the present embodiment, the orifice portion 296b is formed such that the flow path area thereof is smaller than the entire L-shaped pipe 290 except for the orifice portion 296b.

Additionally, the orifice portion 296b is provided to be detachable with respect to the other portion of the L-shaped pipe. In the present embodiment, the orifice portion 296b is point-welded to the elbow pipe 295. Therefore, the orifice portion 296b can be easily attached to and detached from the elbow pipe 295 in comparison with a case where the entire circumference of the orifice portion 296b is welded to the elbow pipe 295. Accordingly, the orifice portion 296b is sufficiently detachable with respect to the elbow pipe 295.

Operation and Effect

Next, the operation and effect of the L-shaped pipe 290 will be described.

Figure 14:
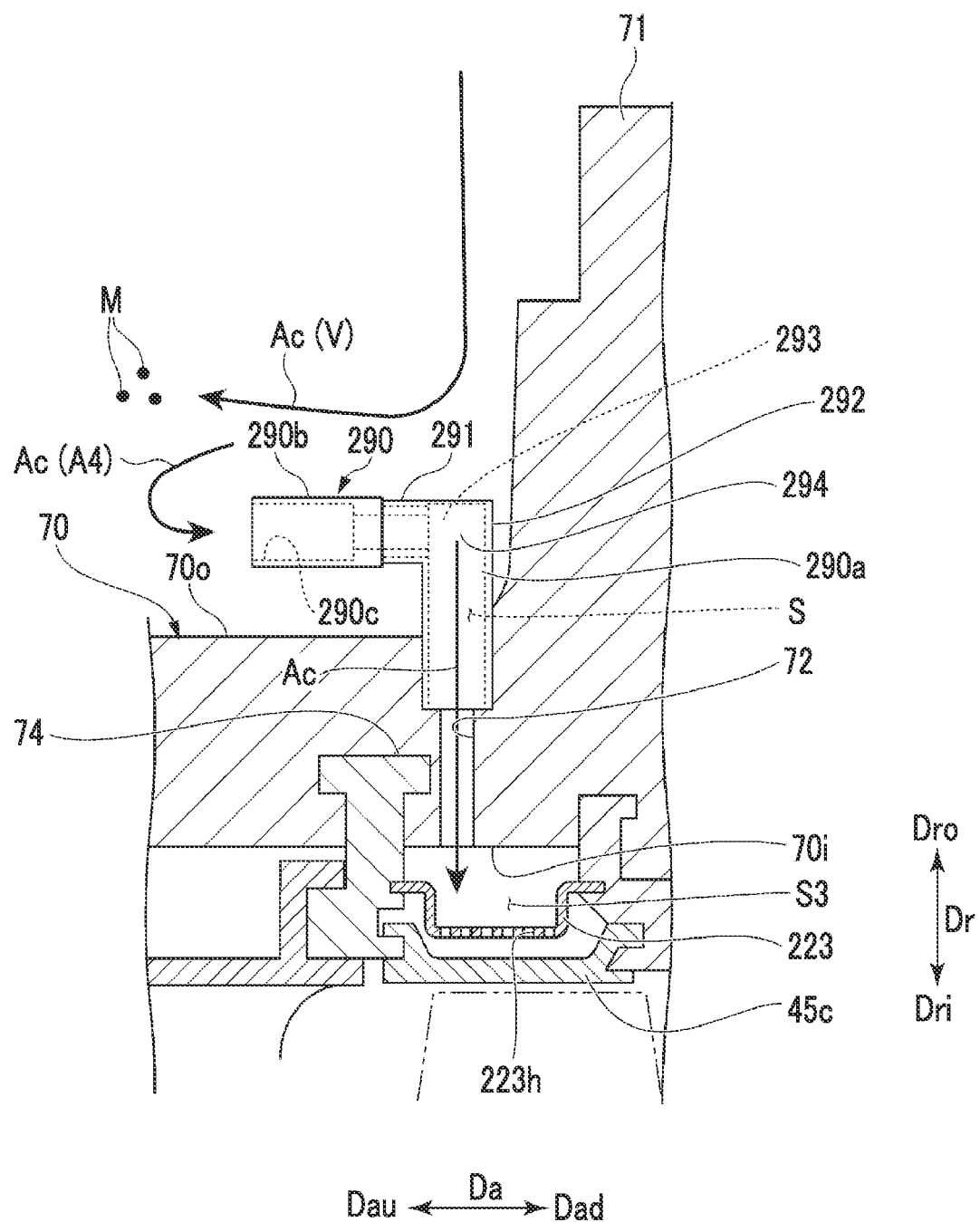
FIG. 14 is a cross-sectional view showing an operation of the L-shaped pipe according to the second embodiment of the present disclosure.

FIG. 14 is a cross-sectional view showing the operation of the L-shaped pipe 290.

In the present embodiment, the L-shaped pipe 290 is provided on the outer peripheral side of the turbine blade ring 70. The L-shaped pipe 290 includes the ceiling wall 291 that covers at least a portion of the air intake port 72 from the outer peripheral side of the turbine blade ring 70 and the rear wall 292 that covers the internal space S between the ceiling wall 291 and the air intake port 72 from the axial downstream side Dad. Therefore, the compressed air Ac flowing along the rear wall 63 of the gas turbine casing 15 does not flow directly into the air intake port 72, and the compressed air Ac turns at an angle exceeding 90 degrees (for example, at an angle of approximately 180 degrees) and flows into the air intake port 72 after flowing through, in a direction from the axial downstream side Dad to the axial upstream side Dau, a space that is positioned on the radial outer side Dro with respect to the L-shaped pipe 290 (refer to an arrow A4 in FIG. 14). During such a process, a foreign substance M (for example, rust or dust) contained in the compressed air Ac flows to a position closer to the axial upstream side Dau than the air intake port 72 is due to the inertial force of the foreign substance M. Therefore, the foreign substance M contained in the compressed air Ac is less likely to enter the air intake port 72. As a result, the second air holes 223h of the second collision plate 223 or a structure composed of the second collision plate 223 and the ring segment 45c is made less likely to be clogged with the foreign substance M.

Other Embodiments

Hereinabove, the embodiments of the present disclosure have been described in detail with reference to the drawings. However, a specific configuration is not limited to the embodiments, and design changes can be made without departing from the gist of the present disclosure. For example, the dust separator 90 is not limited to a component attached to the turbine blade ring 70 by means of the connection structure CS, and may be integrally provided with the turbine blade ring 70 through casting. The first side wall 93 and the second side wall 94 of the dust separator 90 may be omitted. However, in a case where the dust separator 90 includes the first side wall 93 and the second side wall 94, it is possible to further restrain a foreign substance from entering the stator vane 46a. The dust separator 90 may not include the inclined portion 96. The blade ring assembly WS may not include the shielding cover 150.

Additionally, for example, regarding the L-shaped pipe 290, the detachable pipe 296 may not be provided with the orifice portion 296b, and the elbow pipe 295 may have a function of the orifice portion 296b.

APPENDIX

The blade ring assembly WS, the gas turbine 10, and the method for refurbishing the gas turbine 10 described in the embodiments are understood as follows, for example.

(1) The blade ring assembly WS according to a first aspect includes the turbine blade ring 70 that extends in the circumferential direction Dc around the axis Ar, the cooling target component (the stator vane 46a1, the second collision plate 223, and the ring segment 45c) that is disposed on the inner peripheral side of the turbine blade ring 70, and the outer peripheral side component (the dust separator 90 and the L-shaped-pipe 290) that is disposed on the outer peripheral side of the turbine blade ring 70. The turbine blade ring 70 includes the cooling medium intake port (the air intake port 72) leading to the inner peripheral surface 70i of the turbine blade ring 70 from the outer peripheral surface 70o of the turbine blade ring 70. The outer peripheral side cover includes the first wall portion (the ceiling wall 91 and the ceiling wall 291) that covers at least a portion of the cooling medium intake port from the outer peripheral side of the turbine blade ring 70 and that extends to be closer to the axial downstream side Dad, which is one of both sides in the axial direction Da in which the axis Ar extends, than the cooling medium intake port is, and the second wall portion (the rear wall 92 and the rear wall 292) that extends toward the outer peripheral surface 70o of the turbine blade ring 70 from an end portion of the first wall portion on the axial downstream side Dad and that covers at least a portion of the space S between the first wall portion and the cooling medium intake port from the axial downstream side Dad.

According to such a configuration, it is possible to separate a foreign substance and a cooling medium from each other with an inertial force acting on the foreign substance while using a flow of the cooling medium in the gas turbine casing 15 in which the blade ring assembly WS is disposed. As a result, it is possible to restrain the foreign substance from flowing into the cooling target component. That is, the present inventors have found from analysis on how the compressed air Ac flows in the accommodation chamber C that a vortex flow (counter vortex) of the compressed air Ac from the axial upstream side Dau to the axial downstream side Dad exists in the vicinity of the cooling medium intake port of the turbine blade ring 70. In the configuration of the first aspect described above, the foreign substance and the cooling medium are efficiently separated from each other by means of the vortex flow with the outer peripheral side component having a relatively simple shape.

(2) The blade ring assembly WS according to a second aspect is the blade ring assembly WS according to (1), in which the outer peripheral side component further includes the third wall portion (the first side wall 93 and the first side wall 293) that extends toward the outer peripheral surface 70o of the turbine blade ring 70 from an end portion of the first wall portion in the circumferential direction Dc and that covers at least a portion of the space S in the circumferential direction Dc.

According to such a configuration, the cooling medium can be restrained from flowing to an inner side of the outer peripheral side cover in the circumferential direction Dc. Accordingly, the foreign substance and the cooling medium can be separated from each other at a higher probability, and it is possible to further restrain the foreign substance from flowing into the cooling target component.

(3) The blade ring assembly WS according to a third aspect is the blade ring assembly WS according to (1) or (2), in which the outer peripheral side component is the outer peripheral side cover (the dust separator 90) disposed on the outer peripheral side of the turbine blade ring 70.

According to such a configuration, the foreign substance and the cooling medium can be efficiently separated from each other with the outer peripheral side cover having a relatively simple shape.

(4) The blade ring assembly WS according to a fourth aspect is the blade ring assembly WS according to (3), in which the turbine blade ring 70 further includes the first protrusion portion 73a that protrudes toward the axial upstream side Dau, which is one of both sides in the axial direction Da, and the second protrusion portion 73b that is provided at a position different from the first protrusion portion 73a in the circumferential direction Dc and that protrudes toward the axial upstream side Dau. The cooling medium intake port is positioned between the first protrusion portion 73a and the second protrusion portion 73b in the circumferential direction Dc. The outer peripheral side cover is disposed over a region between the first protrusion portion 73a and the second protrusion portion 73b.

According to such a configuration, by straddling the region between the first protrusion portion 73a and the second protrusion portion 73b, the first wall portion that extends to the axial upstream side Dau with a relatively large size can be provided. Accordingly, the foreign substance and the cooling medium can be separated from each other at a higher probability. Accordingly, it is possible to further restrain the foreign substance from flowing into the cooling target component.

(5) The blade ring assembly WS according to a fifth aspect is the blade ring assembly WS according to (4), in which the first protrusion portion 73a and the second protrusion portion 73b include the connecting portions (the end surfaces 73u including the joining holes 73h) connectable to the fixation components (the combustor connection members 80) to which the transition pieces 32 of can-type combustors (the combustors 30) are fixed.

According to such a configuration, with use of the first protrusion portion 73a and the second protrusion portion 73b provided with the connecting portions connected to the fixation components, the first wall portion that extends to the axial upstream side Dau with a relatively large size can be provided. Accordingly, the foreign substance and the cooling medium can be separated from each other at a higher probability without addition of a special protrusion portion, and it is possible to further restrain the foreign substance from flowing into the cooling target component.

(6) The blade ring assembly WS according to a sixth aspect is the blade ring assembly WS according to any one of (3) to (6), in which the turbine blade ring 70 and the outer peripheral side cover are formed of the same material. According to such a configuration, the influence of thermal expansion of the turbine blade ring 70 that acts between the turbine blade ring 70 and the outer peripheral side cover can be reduced. Accordingly, it is possible to suppress the occurrence of a problem at a fixation portion between the turbine blade ring 70 and the outer peripheral side cover, and to extend the lifespan of the blade ring assembly WS.

(7) The blade ring assembly WS according to a seventh aspect is the blade ring assembly WS according to any one of (3) to (6), further including the connection structure CS that removably connects the outer peripheral side cover to the turbine blade ring 70. Here, for example, if the outer peripheral, side cover is directly fixed to the turbine blade ring 70 through welding, there is a possibility that a crack occurs at a welded portion between the turbine blade ring 70 and the outer peripheral side cover because of thermal expansion of the turbine blade ring 70. Meanwhile, with a fixing method in which the connection structure CS is used as described above, it is possible to suppress the occurrence of a crack at the welded portion between the turbine blade ring 70 and the outer peripheral side cover. Accordingly, the lifespan of the blade ring assembly WS can be extended.

(8) The blade ring assembly WS according to an eighth aspect is the blade ring assembly WS according to any one of (3) to (7), further including the removable member (the seal member 85) that is disposed on the inner peripheral side of the turbine blade ring 70, that overlaps with the cooling medium intake port in the radial direction Dr of the turbine blade ring 70, and that is removable to the outer peripheral side of the turbine blade ring 70 through the cooling medium intake port. The outer peripheral side cover is disposed in a region that does not overlap with the removable member in the radial direction Dr.

According to such a configuration, it is possible to remove the removable member to the outer peripheral side through the cooling medium intake port even in a case where the outer peripheral side cover is provided. Accordingly, it is possible to restrain the foreign substance from flowing into the cooling target component while maintaining or improving the assembling workability related to the blade ring assembly WS.

(9) The blade ring assembly WS according to a ninth aspect is the blade ring assembly WS according to any one of (3) to (7), further including the removable member (the seal member 85) that is disposed on the inner peripheral side of the turbine blade ring 70, that overlaps with the cooling medium intake port in the radial direction Dr of the turbine blade ring 70, and that is removable to the outer peripheral side of the turbine blade ring 70 through the cooling medium intake port. The outer peripheral side cover includes the cutout portion 95 in a region that overlaps with the removable member in the radial direction Dr.

According to such a configuration, it is possible to remove the removable member to the outer peripheral side through the cooling medium intake port even in a case where the outer peripheral side cover is provided. Accordingly, it is possible to restrain the foreign substance from flowing into the cooling target component while maintaining or improving the assembling workability related to the blade ring assembly WS.

(10) The blade ring assembly WS according to a tenth aspect is the blade ring assembly WS according to any one of (3) to (9), in which at least a portion of the first wall portion includes the inclined portion 96 that is inclined in such a direction that the inclined portion 96 becomes farther from the outer peripheral surface 70o of the turbine blade ring 70 toward the axial upstream side Dau.

According to such a configuration, a direction in which the compressed air Ac passing through the vicinity of the first wall portion flows can be changed to a direction away from the cooling medium intake port. Accordingly, the foreign substance on which an inertial force acts becomes less likely to enter the cooling medium intake port. As a result, it is possible to further restrain the foreign substance from flowing into the cooling target component.

(11) The blade ring assembly WS according to an eleventh aspect is the blade ring assembly WS according to any one of (1) to (10), in which the cooling target component is the stator vane 46a1 disposed on the inner peripheral side of the turbine blade ring.

Here, the stator vane 46a1 has a certain volume or more, and has a greater influence on the performance of the gas turbine 10 than other portions. According to the configuration of the present aspect, since it is possible to restrain the foreign substance from flowing into the stator vane 46a1, it is possible to efficiently cool the stator vane 46*a*1 and to further suppress a decrease in performance of the gas turbine 10.

(12) The blade ring assembly WS according to a twelfth aspect is the blade ring assembly WS according to (11), in which the stator vane 46*a*1 includes the vane body 110 that is disposed in the combustion gas flow path 49 and that has a vane-like shape, the outer shroud 120 that is provided at an outer peripheral end of the vane body 110 and that includes the first space S1, the inner shroud 130 that is provided at an inner peripheral end of the vane body 110 and that includes the second space S2, and the cooling medium path (the air path 140) that extends from the outer shroud 120 to the inner shroud 130 through the vane body 110, and the inner peripheral side cover (the shielding cover 150) is attached to the inner shroud 130 and covers at least a portion of the second space S2 from an inner peripheral side.

According to such a configuration, the cooling medium is restrained from flowing into the stator vane 46*a*1 from the inner peripheral side. A large amount of the cooling medium, from which the foreign substance has been separated by the outer peripheral side cover, is supplied into the stator vane 46*a*1. Accordingly, it is possible to further restrain the foreign substance from flowing into the stator vane 43*a*1.

(13) The blade ring assembly WS according to a thirteenth aspect is the blade ring assembly WS according to (1) or (2), in which the outer peripheral side component is the L-shaped pipe 290 formed in an L-like shape. The L-shaped pipe 290 includes the first pipe portion 290*a* that extends in the radial direction Dr of the turbine blade ring 70 from the cooling medium intake port, and the second pipe portion 290*b* that extends to a side opposite to the axial downstream side Dad from an and portion of the first pipe portion 290*a* that is on a side opposite to the turbine blade ring 70. The second pipe portion 290*b* communicates with the first pipe portion 290*a* and includes the opening portion 290*c* that is on a side opposite to the first pipe portion 290*a*.

According to such a configuration, the foreign substance and the cooling medium can be efficiently separated from each other with the L-shaped pipe 290 having a relatively simple shape.

(14) The blade ring assembly WS according to a fourteenth aspect is the blade ring assembly WS according to (13), in which the second pipe portion 290*b* extends toward the axial upstream side Dau, which is one of both sides in the axial direction Da, from the first pipe portion 290*a*, and the opening portion 290*c* is open toward the axial upstream side Dau.

According to such a configuration, it is possible to further restrain the foreign substance from flowing into the L-shaped pipe 290. Accordingly, the foreign substance and the cooling medium can be separated from each other more efficiently.

(15) The blade ring assembly WS according to a fifteenth aspect is the blade ring assembly WS according to (13) or (14), in which the L-shaped pipe 290 includes the orifice portion 296*b* having a flow path area smaller than a flow path area of another portion of the L-shaped pipe 290.

According to such a configuration, the flow rate of the cooling medium flowing into the cooling target component at the orifice portion 296*b* can be appropriately adjusted. Accordingly, the cooling target component can be efficiently cooled.

(16) The blade ring assembly WS according to a sixteenth aspect is the blade ring assembly WS according to (15), in which the orifice portion 296*b* is provided to be detachable with respect to the other portion of the L-shaped pipe 290.

According to such a configuration, the orifice portion 296*b* can be easily replaced. Accordingly, the inner diameter of the orifice portion 296*b* can be easily changed.

(17) The blade ring assembly WS according to a seventeenth aspect is the blade ring assembly WS according to (16), in which an inner diameter of the orifice portion 296*b* is smaller than an inner diameter of the opening portion 290*c*.

According to such a configuration, the opening portion 290*c* positioned closer to the axial upstream side Dau than the orifice portion 296*b* is larger than the orifice portion 296*b* in inner diameter. Accordingly, it is possible to suppress an increase in flow rate of the cooling medium that occurs when the cooling medium flows into the L-shaped pipe 290 through the opening portion 290*c*. Therefore, it is possible to make the foreign substance less likely to be sucked into the L-shaped pipe 290.

(18) The blade ring assembly WS according to an eighteenth aspect is the blade ring assembly WS according to any one of (13) to (17), in which the turbine blade ring 70 and the L-shaped pipe 290 are formed of the same material. According to such a configuration, the influence of thermal expansion of the turbine blade ring 70 that acts between the turbine blade ring 70 and the L-shaped pipe 290 can be reduced. Accordingly, it is possible to suppress the occurrence of a problem at a fixation portion between the turbine blade ring 70 and the L-shaped pipe 290, and to extend the lifespan of the blade ring assembly WS.

(19) The gas turbine 10 according to a nineteenth aspect includes the blade ring assembly WS according to any one of (1) to (18), the rotor (the gas turbine rotor 11) that is rotatable around the axis Ar, the casing (the gas turbine casing 15) that covers an outer peripheral side of the rotor, and the can-type combustor (the combustor 30) that generates a combustion gas through combustion of fuel and that sends the combustion gas into the casing. The blade ring assembly WS is disposed on an inner peripheral side of the casing. The casing includes, as a portion of a wall portion that defines the accommodation chamber C in which the blade ring assembly WS is exposed and a cooling medium flows, a partition wall that is provided closer to the axial downstream side Dad than the cooling medium intake port is and that extends in the radial direction Dr of the turbine blade ring 70. According to such a configuration, the foreign substance and the cooling medium can be separated from each other by means of an inertial force in the gas turbine 10, and the foreign substance can be restrained from flowing into the cooling target component.

(20) The gas turbine 10 according to a twentieth aspect is the gas turbine 10 according to (19), in which the cooling target component included in the blade ring assembly WS constitutes a first-stage turbine stator vane in the axial direction Da. Here, the temperature of the first-stage turbine stator vane is likely to be increased in comparison with turbine stator vanes of the second and subsequent stages with the first-stage turbine stator vane receiving heat of the combustion gas G, and thus, the influence of the first-stage turbine stator vane on the performance of the gas turbine 10 is large. According to the configuration of the present aspect, it is possible to restrain the foreign substance from flowing into the first-stage turbine stator vane, and thus, it is possible to efficiently cool the first-stage turbine stator vane and to further suppress a decrease in performance of the gas turbine 10.

(21) A method for refurbishing the gas turbine 10 according to a twenty-first aspect is a method for refurbishing the gas turbine 10 including the turbine blade ring 70 and the stator vane 46*a*1 disclosed on the inner peripheral, side of the turbine blade ring 70, the method including a step of removing the stator vane 46*a*1 from the turbine blade ring 70, a step of attaching the shielding cover 150 to a turbine stator vane, and a step of attaching the stator vane 46*a*1 with the shielding cover 150 attached thereto to the turbine blade ring 70 with the foreign substance separation cover (the dust separator 90) attached thereto. The turbine stator vane includes the vane body 110 that is disposed in the combustion gas flow path 49 and that has a vane-like shape and the inner shroud 130 that is provided at an inner peripheral end of the vane body 110 and that includes the space (the second space S2). The shielding cover 150 is attached to the inner shroud 130 so that the shielding cover 150 covers at least a portion of the space of the inner shroud 130 from the inner peripheral side. The turbine blade ring 70 includes the cooling medium intake port (the air intake port 72) that leads to the inner peripheral surface 70*i* of the turbine blade ring 70 from the outer peripheral surface 70*o* of the turbine blade ring 70, and the foreign substance separation cover is disposed on the outer peripheral side of the turbine blade ring 70 and covers at least a portion of the cooling medium intake port.

According to such a configuration, the cooling medium is restrained from flowing into the stator vane 46*a*1 from the inner peripheral side. A large amount of the cooling medium, from which the foreign substance has been separated by the outer peripheral side cover, is supplied into the stator vane 46*a*1. Accordingly, it is possible to further restrain the foreign substance from flowing into the stator vane 46*a*1.

INDUSTRIAL APPLICABILITY

According to a blade ring assembly, a gas turbine, and a method for refurbishing a gas turbine of the present disclosure, it is possible to restrain a foreign substance from flowing into a cooling target component such as a stator vane, for example.

REFERENCE SIGNS LIST

10: gas turbine
11: gas turbine rotor
15: gas turbine casing
20: compressor
30: combustor
41: turbine rotor
45: turbine casing
46*a*1: stator vane
61: front wall
62: peripheral wall
63: rear wall
70: turbine blade ring
70*o*: outer peripheral surface
70*i*: inner peripheral surface
72: air intake port
73*a*: first protrusion portion
73*b*: second protrusion portion
73*h*: joining hole
80: combustor connection member
81: frame body portion
82: flange
90: dust separator
91: ceiling wall
92: rear wall
93: first side wall
94: second side wall
95: cutout portion
96: inclined portion
110: vane body
120: outer shroud
130: inner shroud
140: air path
150: shielding cover
WS: blade ring assembly
223: second collision plate
223*h*: second air hole
290: L-shaped pipe
290*a*: first pipe portion
290*b*: second pipe portion
290*c*: opening portion
291: ceiling wall
292: rear wall
293: first side wall
294: second side wall
295: elbow pipe
295*a*: cylindrical portion
295*b*: connecting portion
296: detachable pipe
296*a*: large-diameter pipe
296*b*: orifice portion
S1: first space
S2: second space
S3: third space

The invention claimed is:
1. A blade ring assembly comprising:
a turbine blade ring that extends in a circumferential direction around an axis;
a cooling target component that is disposed on an inner peripheral side of the turbine blade ring; and
an outer peripheral side component that is disposed on an outer peripheral side of the turbine blade ring,
wherein the turbine blade ring includes a cooling medium intake port leading to an inner peripheral surface of the turbine blade ring from an outer peripheral surface of the turbine blade ring,
the outer peripheral side component includes
a first wall portion that covers at least a portion of the cooling medium intake port from the outer peripheral side of the turbine blade ring and that extends to be closer to an axial downstream side, which is opposite to an axial upstream side in an axial direction in which the axis extends, than the cooling medium intake port is, and
a second wall portion that extends toward the outer peripheral surface of the turbine blade ring from an end portion of the first wall portion on the axial downstream side and that covers at least a portion of a space between the first wall portion and the cooling medium intake port from the axial downstream side,
wherein the outer peripheral side component is an outer peripheral side cover disposed on the outer peripheral side of the turbine blade ring,
wherein the turbine blade ring further includes a first protrusion portion that protrudes toward the axial upstream side, and a second protrusion portion that is provided at a position different from the first protrusion portion in the circumferential direction and that protrudes toward the axial upstream side,
the cooling medium intake port is positioned between the first protrusion portion and the second protrusion portion in the circumferential direction, and the outer peripheral side cover is disposed over a region between the first protrusion portion and the second protrusion portion.

2. The blade ring assembly according to claim 1, wherein the outer peripheral side component further includes a third wall portion that extends toward the outer peripheral surface of the turbine blade ring from an end portion of the first wall portion in the circumferential direction and that covers at least a portion of the space in the circumferential direction.

3. The blade ring assembly according to claim 1, wherein the first protrusion portion and the second protrusion portion include connecting portions connectable to fixation components to which transition pieces of can-type combustors are fixed.

4. The blade ring assembly according to claim 1, wherein the turbine blade ring and the outer peripheral side cover are formed of the same material.

5. The blade ring assembly according to claim 1, further comprising:
a connection structure that removably connects the outer peripheral side cover to the turbine blade ring.

6. A blade ring assembly comprising:
a turbine blade ring that extends in a circumferential direction around an axis;
a cooling target component that is disposed on an inner peripheral side of the turbine blade ring; and
an outer peripheral side component that is disposed on an outer peripheral side of the turbine blade ring,
wherein the turbine blade ring includes a cooling medium intake port leading to an inner peripheral surface of the turbine blade ring from an outer peripheral surface of the turbine blade ring,
the outer peripheral side component includes
a first wall portion that covers at least a portion of the cooling medium intake port from the outer peripheral side of the turbine blade ring and that extends to be closer to an axial downstream side, which is opposite to an axial upstream side in an axial direction in which the axis extends, than the cooling medium intake port is, and
a second wall portion that extends toward the outer peripheral surface of the turbine blade ring from an end portion of the first wall portion on the axial downstream side and that covers at least a portion of a space between the first wall portion and the cooling medium intake port from the axial downstream side,
wherein the outer peripheral side component is an outer peripheral side cover disposed on the outer peripheral side of the turbine blade ring,
wherein the blade ring assembly further comprises a removable member that is disposed on the inner peripheral side of the turbine blade ring, that overlaps with the cooling medium intake port in a radial direction of the turbine blade ring, and that is removable to the outer peripheral side of the turbine blade ring through the cooling medium intake port, and
wherein the outer peripheral side cover is disposed in a region that does not overlap with the removable member in the radial direction.

7. A blade ring assembly comprising:
a turbine blade ring that extends in a circumferential direction around an axis;
a cooling target component that is disposed on an inner peripheral side of the turbine blade ring; and
an outer peripheral side component that is disposed on an outer peripheral side of the turbine blade ring,
wherein the turbine blade ring includes a cooling medium intake port leading to an inner peripheral surface of the turbine blade ring from an outer peripheral surface of the turbine blade ring,
the outer peripheral side component includes
a first wall portion that covers at least a portion of the cooling medium intake port from the outer peripheral side of the turbine blade ring and that extends to be closer to an axial downstream side, which is opposite to an axial upstream side in an axial direction in which the axis extends, than the cooling medium intake port is, and
a second wall portion that extends toward the outer peripheral surface of the turbine blade ring from an end portion of the first wall portion on the axial downstream side and that covers at least a portion of a space between the first wall portion and the cooling medium intake port from the axial downstream side,
wherein the blade ring assembly further comprises a removable member that is disposed on the inner peripheral side of the turbine blade ring, that overlaps with the cooling medium intake port in a radial direction of the turbine blade ring, and that is removable to the outer peripheral side of the turbine blade ring through the cooling medium intake port, and
wherein the outer peripheral side cover includes a cutout portion in a region that overlaps with the removable member in the radial direction.

8. The blade ring assembly according to claim 1, wherein at least a portion of the first wall portion includes an inclined portion that is inclined in such a direction that the inclined portion becomes farther from the outer peripheral surface of the turbine blade ring toward the axial upstream side.

9. The blade ring assembly according to claim 1, wherein the cooling target component is a stator vane disposed on the inner peripheral side of the turbine blade ring.

10. The blade ring assembly according to claim 9, further comprising:
an inner peripheral side cover that is attached to the stator vane,
wherein the stator vane includes
a vane body that is disposed in a combustion gas flow path and that has a vane-like shape,
an outer shroud that is provided at an outer peripheral end of the vane body and that includes a first space,
an inner shroud that is provided at an inner peripheral end of the vane body and that includes a second space, and
a cooling medium path that extends from the outer shroud to the inner shroud through the vane body, and
the inner peripheral side cover is attached to the inner shroud and covers at least a portion of the second space from an inner peripheral side of the vane body.

11. A gas turbine comprising:
the blade ring assembly according to claim 1;
a rotor that is rotatable around the axis;
a casing that covers an outer peripheral side of the rotor; and
a can-type combustor that generates a combustion gas through combustion of fuel and that sends the combustion gas into the casing,
wherein the blade ring assembly is disposed on an inner peripheral side of the casing, and the casing includes, as a portion of a wall portion that defines an accommodation chamber in which the blade ring assembly is exposed and a cooling medium flows, a partition wall that is provided closer to the axial downstream side than the cooling medium intake port is and that extends in a radial direction of the turbine blade ring.

12. The gas turbine according to claim 11,
wherein the cooling target component included in the blade ring assembly constitutes a first-stage turbine stator vane in the axial direction.

\* \* \* \* \*